(12) United States Patent
Shinkai et al.

(10) Patent No.: US 8,140,956 B2
(45) Date of Patent: Mar. 20, 2012

(54) DEVICE, METHOD, AND PROGRAM FOR REPRODUCING DATA FOLLOWING A COUNTDOWN

(75) Inventors: Mitsutoshi Shinkai, Kanagawa (JP); Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 11/807,824

(22) Filed: May 30, 2007

(65) Prior Publication Data
US 2008/0005323 A1 Jan. 3, 2008

(30) Foreign Application Priority Data

May 31, 2006 (JP) ................................. 2006-151014

(51) Int. Cl.
*G06F 17/00* (2006.01)
(52) U.S. Cl. ....................................................... 715/203
(58) Field of Classification Search .................... 715/203
See application file for complete search history.

(56) References Cited

U.S. PATENT DOCUMENTS

| | | | | |
|---|---|---|---|---|
| 5,629,740 A | * | 5/1997 | Tanaka et al. | 348/515 |
| 5,894,328 A | * | 4/1999 | Negishi | 375/240.25 |
| 6,404,978 B1 | * | 6/2002 | Abe | 386/55 |
| 6,526,217 B1 | * | 2/2003 | Fujinami | 386/52 |
| 6,546,188 B1 | * | 4/2003 | Ishii et al. | 386/52 |
| 6,728,312 B1 | * | 4/2004 | Whitford et al. | 375/240.01 |
| 6,751,404 B1 | * | 6/2004 | Whitford et al. | 386/100 |
| 6,778,756 B1 | * | 8/2004 | Fujimura et al. | 386/52 |
| 2003/0229847 A1 | * | 12/2003 | Kim | 715/501.1 |
| 2004/0131337 A1 | * | 7/2004 | Ono et al. | 386/95 |
| 2006/0132607 A1 | * | 6/2006 | Kimber et al. | 348/207.1 |
| 2007/0094314 A1 | * | 4/2007 | Hsieh | 707/205 |

FOREIGN PATENT DOCUMENTS

| | | |
|---|---|---|
| JP | 10-222967 | 8/1998 |
| JP | 11-136609 | 5/1999 |
| WO | WO 2004059650 A1 * | 7/2004 |

\* cited by examiner

*Primary Examiner* — Laurie Ries
*Assistant Examiner* — Frank D Mills
(74) *Attorney, Agent, or Firm* — Frommer Lawrence & Haug LLP; William S. Frommer; Thomas F. Presson

(57) ABSTRACT

A reproduction device reproducing data by reading data recorded in a recording medium and buffering the read data to a predetermined buffer. The reproduction device includes: a setting unit setting a countdown time; a determination unit determining whether or not the countdown time is equal to or more than a minimum reproduction delay time; a requirement unit requiring a change of the countdown time when it is determined that the countdown time is less than the minimum reproduction delay time by the determination; and a countdown unit performing countdown from a time before the countdown time earlier than a time at which reproduction of the data is started when it is determined the countdown time is equal to or more than the minimum reproduction delay time by the determination unit.

12 Claims, 18 Drawing Sheets

FIG. 6

```
1  <?xml version="1.0" encoding="UTF-8"?>
2  <smil umid="060A2B340101050101D04313000000B180C0009350597080046020118F805"
3   xmlns="urn:schemas-professionalDisc:edl:ver.1.00:editlist">
4    <body>
5      <par>
6        <!-- Clip1 -->
7        <ref src="urn:smpte:umid:060A2B340101050101D04313000000070D3020009350597080046020118F454"
8         clipBegin="smpte-30=00:00:00:00" clipEnd="smpte-30=00:00:06:00" begin="smpte-30=00:00:00:00"
9         trackSrc="CH1;CH2;CH3;CH4" trackDst="CH1;CH2;CH3;CH4"/>
10       <!-- Clip2 -->
11       <ref src="urn:smpte:umid:060A2B340101050101D04313000000006B830200923505800800046020118F7D8"
12        clipBegin="smpte-30=00:00:00:00" clipEnd="smpte-30=00:00:04:00" begin="smpte-30=00:00:06:00"
13        trackSrc="CH1;CH2;CH3;CH4" trackDst="CH1;CH2;CH3;CH4"/>
14     </par>
15   </body>
16 </smil>
```

| PROCESSING CONTENTS | EACH PROCESSING TIME (SECOND) | EACH PROCESSING START (SECOND) | READING START LIMIT (SECOND) | STORAGE TIME (SECOND) |
|---|---|---|---|---|
| READING MATERIAL DATA | 0.8 | 0 | 0 | 0 |
| SEEK | 1 | 0.8 | | 1.2 |
| READING MATERIAL DATA | 0.8 | 1.8 | 2 | 0.2 |
| SEEK | 1 | 2.6 | | 1.4 |
| READING MATERIAL DATA | 0.8 | 3.6 | 4 | 0.4 |
| SEEK | 1 | 4.4 | | 1.6 |
| READING MATERIAL DATA | 0.8 | 5.4 | 6 | 0.6 |
| SEEK | 1.8 | 6.2 | | 1.8 |
| (MATERIAL DATA END) | | 8 | 8 | |
| TOTAL | 8 | | | |

FIG. 8A

| PROCESSING CONTENTS | EACH PROCESSING TIME (SECOND) | EACH PROCESSING START (SECOND) | READING START LIMIT (SECOND) | STORAGE TIME (SECOND) |
|---|---|---|---|---|
| READING MATERIAL DATA | 0.4 | 0 | 0 | 0 |
| SEEK | 1 | 0.4 | | 0.6 |
| READING MATERIAL DATA | 0.4 | 1.4 | 1 | -0.4 |
| SEEK | 1 | 1.8 | | 0.2 |
| READING MATERIAL DATA | 0.4 | 2.8 | 2 | -0.8 |
| SEEK | 1 | 3.2 | | -0.2 |
| READING MATERIAL DATA | 0.4 | 4.2 | 3 | -1.2 |
| SEEK | 1 | 4.6 | | -0.6 |
| READING MATERIAL DATA | 0.4 | 5.6 | 4 | -1.6 |
| SEEK | 1 | 6 | | -1 |
| READING MATERIAL DATA | 0.4 | 7 | 5 | -2 |
| SEEK | 1 | 7.4 | | -1.4 |
| READING MATERIAL DATA | 0.4 | 8.4 | 6 | -2.4 |
| SEEK | 1 | 8.8 | | -1.8 |
| READING MATERIAL DATA | 0.4 | 9.8 | 7 | -2.8 |
| (MATERIAL DATA END) | | 10.2 | | |
| TOTAL | 10.2 | | | |

FIG. 8B

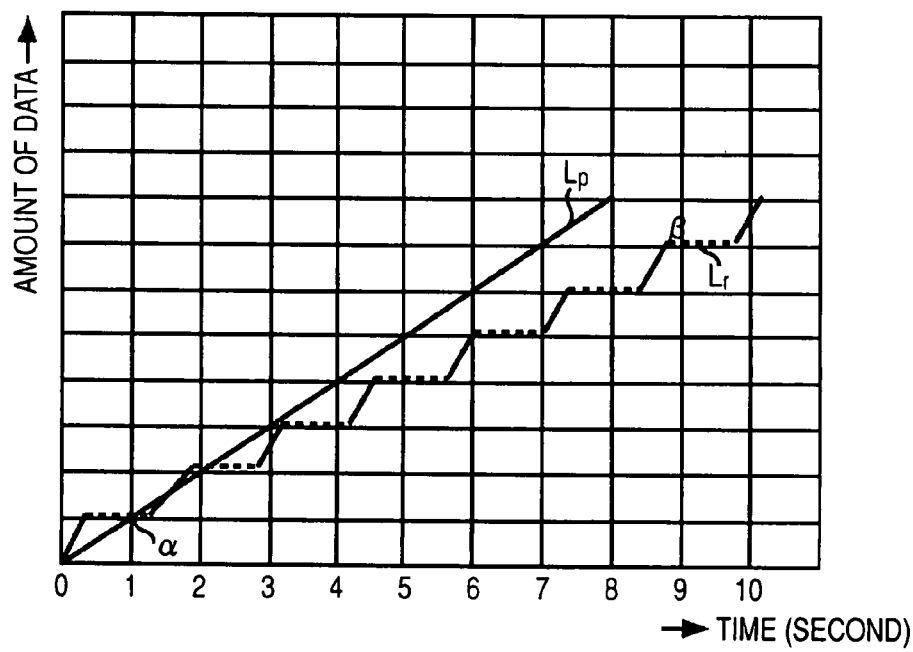

FIG. 9A

| PROCESSING CONTENTS | EACH PROCESSING TIME (SECOND) | EACH PROCESSING START (SECOND) | READING START LIMIT (SECOND) | STORAGE TIME (SECOND) |
|---|---|---|---|---|
| READING MATERIAL DATA | 0.4 | -2.8 | 0 | 2.8 |
| SEEK | 1 | -2.4 | | 3.4 |
| READING MATERIAL DATA | 0.4 | -1.4 | 1 | 2.4 |
| SEEK | 1 | -1 | | 3 |
| READING MATERIAL DATA | 0.4 | 0 | 2 | 2 |
| SEEK | 1 | 0.4 | | 2.6 |
| READING MATERIAL DATA | 0.4 | 1.4 | 3 | 1.6 |
| SEEK | 1 | 1.8 | | 2.2 |
| READING MATERIAL DATA | 0.4 | 2.8 | 4 | 1.2 |
| SEEK | 1 | 3.2 | | 1.8 |
| READING MATERIAL DATA | 0.4 | 4.2 | 5 | 0.8 |
| SEEK | 1 | 4.6 | | 1.4 |
| READING MATERIAL DATA | 0.4 | 5.6 | 6 | 0.4 |
| SEEK | 1 | 6 | | 1 |
| READING MATERIAL DATA | 0.4 | 7 | 7 | 0 |
| SEEK | 1 | 7.4 | | 0.6 |
| (MATERIAL DATA END) | | | 8 | |
| TOTAL | 11.2 | | | |

FIG. 9B

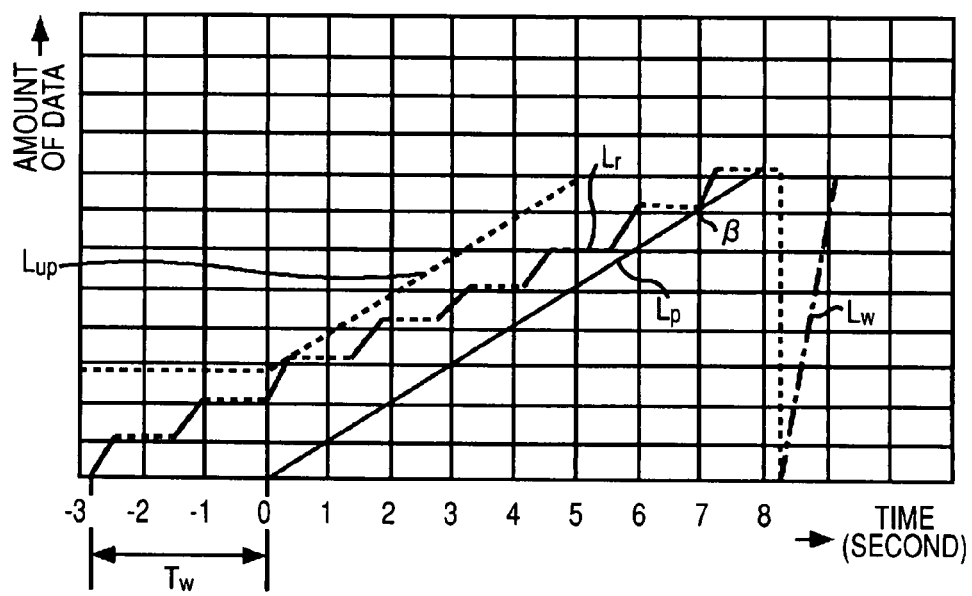

*FIG. 14*

```
1   <?xml version="1.0" encoding="UTF-8"?>
2   <smil umid="060A2B3401010501010D43130000000B180C000935059708004602011 8F807"
3    xmlns="urn:schemas-professionalDiscedit:ver.1.00:editlist">
4     <body>
5       <par>
6         <!-- Clip1 -->
7         <ref src="urn:smpte:umid:060A2B3401010501010D4313000000070D30200009350597080046020118F454"
8          clipBegin="smpte-30=00:00:00:00" clipEnd="smpte-30=00:00:06:00" begin="smpte-30=00:00:00:00"
9          trackSrc="CH1;CH2;CH3" trackDst="CH1;CH2;CH3"/>
10        <!-- Clip2 -->
11        <ref src="urn:smpte:umid:060A2B3401010501010D43130000006B830200092350580080046020118F7D8"
12         clipBegin="smpte-30=00:00:00:00" clipEnd="smpte-30=00:00:04:00" begin="smpte-30=00:00:06:00"
13         trackSrc="CH1;CH2;CH3" trackDst="CH1;CH2;CH3"/>
14        <!-- Voice Over -->
15        <audio src="urn:smpte:umid:060A2B3401010501010843130000000D9510E0033360597080046020118070 7"
16         clipBegin="smpte-30=00:00:00:00" clipEnd="smpte-30=00:00:10:00" begin="smpte-30=00:00:00:00"
17         trackSrc="CH4" trackDst="CH4"/>
18      </par>
19    </body>
20  </smil>
```

DEVICE, METHOD, AND PROGRAM FOR REPRODUCING DATA FOLLOWING A COUNTDOWN

CROSS REFERENCE TO RELATED APPLICATIONS

The present invention claims the benefit of prior Japanese Patent Application JP 2006-151014 filed in the Japanese Patent Office on May 31, 2006, the entire contents of which are hereby incorporated by reference herein.

BACKGROUND

1. Technical Field

The present invention relates generally to a reproduction device and a reproduction method, and a program, and in particular, to a reproduction device and a reproduction method, and a program for reproducing data in real time following a countdown.

2. Background Discussion

In conventional editing, an editor performs voice insertion editing in which a voice signal, such as, narration is inserted into video data or voice data that has been recorded in a tape.

During insertion editing, the video data recorded on the tape is reproduced and displayed. A user inputs voice, such as the narration, at a desired time while viewing the displayed video. However, as described above, typically the timing of the narration is inevitably delayed due to a delayed response when the user inputs the voice narration while viewing the displayed video.

One example of an editor displays the countdown after pre-rolling to a predetermined time from an insertion starting point corresponding to the time at which the voice is input when the voice insertion editing is instructed by the user. Accordingly, the user can input the audio at the desired time.

However, when data to be reproduced is followed by data recorded on an optical disc recorded in a remote recording area, a search for the remote recording area separated from one recording medium is performed. When a search time required for the search is too long, the reading of data to be currently reproduced does not match the reproduction time and the reproduction is interrupted. Thus, the data cannot be reproduced in real time (continuous reproduction).

The data is reproduced from the optical disc by reading the data recorded in the optical disc, buffering the read data to a predetermined buffer, and processing the buffered data.

In this case, a reading rate of the data from the optical disc is larger than a data reproducing rate. Accordingly, a rate of data input into the buffer is larger than a rate of data output from the buffer. Therefore, data read from the optical disc is slowly accumulated in the buffer.

However, when the search is performed, the data is not read from the optical disc. Accordingly, the data is merely output from the buffer for the reproduction, thereby reducing an amount of data in the buffer. When the search is ended and the data is not read from the optical disc until the data does not exist in the buffer, the buffer is underflowed, thereby interrupting the reproduction.

Therefore, when the amount of data accumulated in the buffer is adequate prior to the search, it is possible to prevent the reproduction from being interrupted due to the searching being performed. Typically, this is because a predetermined amount of data is read from the optical disc and the data that has been read is accumulated in the buffer so as to reproduce the data in real time by considering the search time before starting the reproduction. In this example, a time is required to read the predetermined amount of data from the optical disc before starting the reproduction.

SUMMARY OF THE INVENTION

As described above, it may be helpful to read a predetermined amount of data from an optical disc before starting reproduction so as to reproduce video data or voice data from the optical disc in real time.

When a user inserts voice such as narration into the video data or the voice data recorded in the optical disc at the time obtained by a countdown instruction, it may be difficult to accumulate an amount of data required for reproducing the data in real time in the buffer before a countdown display has ended. This is true even though insertion of the voice is instructed by the user and reading of the video data from the optical disc is started during a predetermined time required for displaying the countdown, which is short. As a result, it may be difficult to accurately reproduce the video data in real time after the display of the countdown has ended.

The present invention is directed to a method and system that assists a user to add VO, or narrative comments, by accurately depicting a count down before the VO or narrative comments should be added. This is achieved by depicting a count down window for the user. Specifically, in one embodiment, a buffer stores several seconds of a delay prior to displaying the material, or content data. Also, the user may edit the count down time to increase or decrease the count down time. Thus, a level of certainty is added to the VO process since the user does not need to guess, or estimate when the VO data should be added.

The present invention facilitates reproducing data in real time after a countdown display has ended.

According to an embodiment of the invention, there is provided a reproduction device reproducing data by reading data recorded in a recording medium and buffering the read data to a predetermined buffer, the reproduction device including a setting unit setting a countdown time serving as a time for countdown; a determination unit determining whether or not the countdown time is equal to or more than a minimum reproduction delay time which is a minimum value of a reproduction delay time from starting to read the data from the recording medium to starting to reproduce the data, which is required to reproduce the data in real time; a changing unit configured to change the countdown time when it is determined that the countdown time is less than the minimum reproduction delay time by the determination; and a countdown unit performing countdown from a time before the countdown time earlier than a time at which reproduction of the data is started when it is determined the countdown time is equal to or more than the minimum reproduction delay time by the determination unit.

The setting unit can change the countdown time on the basis of the minimum reproduction delay time when the change of the countdown time is required by the requirement unit.

According to another embodiment of the invention, the reproduction device further includes an acquisition unit acquiring voice data added to the data during the reproduction of the data; and a recording control unit recording the voice data acquired by the acquisition unit in the recording medium.

According to yet another embodiment of the invention, the reproduction device further includes a reproduction unit reproducing the data and the voice data simultaneously by reading the data recorded in the recording medium and the voice data and buffering the data and the voice data to the predetermined buffer.

According to yet another embodiment of the invention, there is provided a reproduction method of a reproduction device reproducing data by reading data recorded in a recording medium and buffering the data to a predetermined buffer including the steps of setting a countdown time serving as a time for countdown; determining whether or not the countdown time is equal to or more than a minimum reproduction delay time which is a minimum value of a reproduction delay time from starting to read the data from the recording medium to starting to reproduce the data, which is required to reproduce the data in real time; requiring a change of the countdown time when it is determined that the countdown time is less than the minimum reproduction delay time; and performing countdown from a time before the countdown time earlier than a time at which reproduction of the data is started when it is determined the countdown time is equal to or more than the minimum reproduction delay time.

According to yet another embodiment of the invention, there is provided a program allowing a computer to execute a process of reproducing data by reading data recorded in a recording medium and buffering the data to a predetermined buffer including the steps of setting a countdown time serving as a time for countdown; determining whether or not the countdown time is equal to or more than a minimum reproduction delay time which is a minimum value of a reproduction delay time from starting to read the data from the recording medium to starting to reproduce the data, which is required to reproduce the data in real time; requiring a change of the countdown time when it is determined that the countdown time is less than the minimum reproduction delay time; and performing countdown from a time before the countdown time earlier than a time at which reproduction of the data is started when it is determined the countdown time is equal to or more than the minimum reproduction delay time.

According to yet another embodiment of the invention, a countdown time serving as a time for countdown is set, it is determined whether or not the countdown time is equal to or more than a minimum reproduction delay time which is a minimum value of a reproduction delay time from starting to read the data from the recording medium to starting to reproduce the data, which is required to reproduce the data in real time. A change of the countdown time is required when it is determined that the countdown time is less than the minimum reproduction delay time by the determination and countdown from a time before the countdown time earlier than a time at which reproduction of the data is started is performed when it is determined the countdown time is equal to or more than the minimum reproduction delay time.

According to yet another embodiment of the invention, a device may be an independent device or a block performing a reproduction process in a recording and reproducing device.

As described above, according to the embodiments of the invention, it is possible to reproduce data in real time after countdown is ended.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 6 illustrates an example of an edit list before adding VO according to an embodiment of the present invention.

FIGS. 8A and 8B are diagrams illustrating a minimum reproduction delay time according to another embodiment of the present invention.

FIGS. 9A and 9B are diagrams illustrating a minimum reproduction delay time according to yet another embodiment of the present invention.

FIG. 14 is a diagram illustrating an example of an edit list after adding VO according to an embodiment of the present invention.

DETAILED DESCRIPTION

Figure 1:
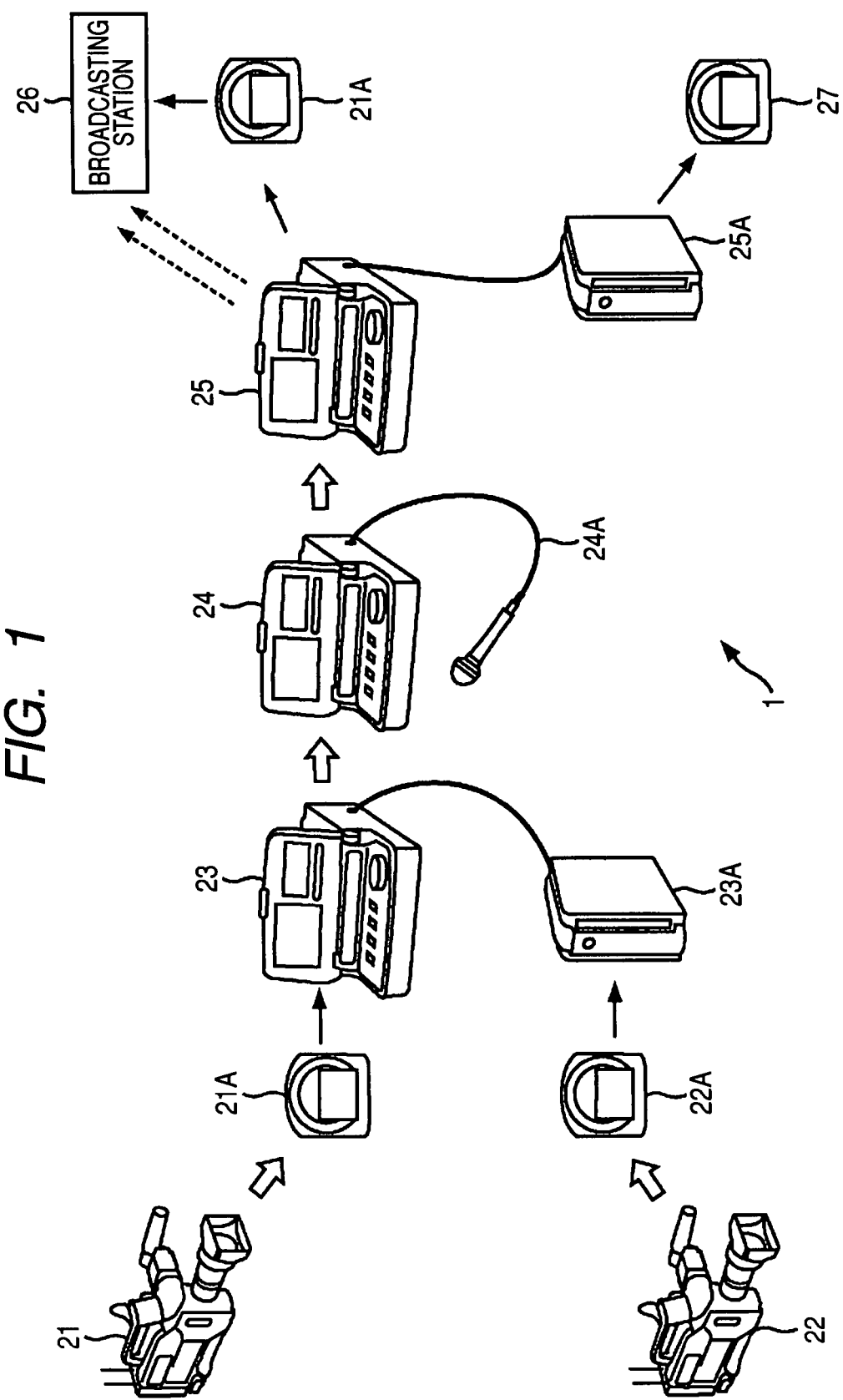
FIG. 1 illustrates an example of an editing system according to an embodiment of the invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S.

patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Hereinafter, detailed embodiments according to the invention will be specifically described with reference to the accompanying drawings.

FIG. 1 illustrates an example of an editing system 1 according to an embodiment of the invention.

The editing system 1 of FIG. 1 may be used for editing of recorded data, for example, a recorded television program. A process for editing the television program includes integrating a disc, editing of portion of video data, superimposing of voice-over (hereinafter, referred to as "VO") on the portion of the video data, transmitting a white package, or recording of the white package.

Integrating the disc represents a process of integrating material data such as video data or voice data on scenes that constitute television programs recorded on a plurality of optical discs onto one optical disc. The editing of the video represents a process of performing nonlinear editing by selecting a selected range of the material data and arranging the selected material data in a contemplated, or predetermined, sequence.

Superimposing the VO represents a process of adding the VO to an editing result by recording the VO data to reproduce the material data constituting the result of the editing of the video and voice-over data (hereinafter, referred to as VO data) serving as voice data such as narration. The transmitting of the white package represents a process of transmitting the editing result after adding the VO to a broadcasting station as the white package. The white package represents incomplete data which is not yet completed by superimposing of characters or figures. The recording of the white package represents a process of recording the white package on the optical disc.

The editing system 1 of FIG. 1 is an editing support system supporting functions in the processes. The editing system 1 includes camcorders 21 and 22, a video editor unit 23, a VO adding device 24, and a white package recording device 25.

The camcorders 21 and 22 are used for recording video data, such as a broadcast, a television broadcast sporting event, such as a baseball game, football game etc., a movie (including acquiring voice data). The camcorders 21 and 22 may also suitably record material data acquired by photography, such as photographic data, which may be stored on an optical disc 21A or 22A as a data file or image file or other suitable storage format.

Based on user input, the camcorders 21 and 22 generate information on recording such as information useful in the subsequent editing of the video and may also associate metadata with the material data acquired by the camcorders 21 and 22.

One or more optical disc (shown as elements 21A and 22A) are used as a storage medium in which the material data and/or the metadata associated therewith is loaded on an internal drive (not shown) or an external drive 23A of the video editor unit 23.

The video editor unit 23 is used for integrating onto one optical disc i.e., optical disc 21A material data of scenes constituting a television program recorded on the optical disc 21A or 22A loaded on the internal drive or the external drive 23A and for editing the material data integrated onto the optical disc 21A.

The video editor unit 23 is used to copy the material data recorded on the optical disc 22A to the optical disc 21A as needed. The video editor unit 23 edits the material data recorded in the optical disc 21A by the user input, prepares an edit list serving as information on the editing result, and records the edit list on the optical disc 21A.

The VO adding device 24 is used for adding the VO to the editing result acquired by the video editor unit 23. The optical disc 21A on which the material data and the edit list are recorded is loaded on the VO adding device 24 and the microphone 24A mat also be connected to the VO adding device 24.

The VO adding device 24 reproduces the material data constituting the editing result in accordance with the edit list recorded on the optical disc 21A and adds voice input into the microphone 24A during reproduction to the editing result as the VO. In other words, the VO adding device 24 records VO data on the optical disc 21A so as to reproduce the material data constituting the editing result during reproduction and VO data serving as voice data input during reproducing the editing result.

The white package recording device 25 may transmit and/or record the editing result as the white package after adding the VO. The optical disc 21A in which the VO data is recorded by the VO adding device 24 is loaded on the internal drive (not shown) of the white package recording device 25. The material data and the VO data recorded in the optical disc 21A are simultaneously reproduced in accordance with the edit list recorded in the optical disc 21A as the white package. The white package is transmitted to the broadcasting station 26 as a baseband by using an FPU (Field Pickup Unit) or an SNG (Satellite News Gathering) unit.

The white package recording device 25 combines the material data constituting the editing result recorded in the optical disc 21A in accordance with the edit list recorded in the optical disc 21A in which the VO data is recorded and rewrites VO data of a predetermined channel onto voice data of a predetermined channel included in the material data to transmit the resultant acquired material data to the broadcasting station 26 as a file in which the white package is integrated on the basis of a protocol or mode such as, for example, an FTP (File Transfer Protocol) or an FAM (File Access Mode).

For example, the FAM is a type of transmitting file-type data selected from data of type handled in a bus interface, such as i.LINK™ (i.LINK is a registered trademark of Sony Corporation). The broadcasting station 26 records the file in which the white package is integrated on an optical disc (not shown) and prepares an optical disc on which the file in which the white package is integrated is recorded.

The optical disc 21A on which the VO data is recorded may be delivered to the broadcasting station 26.

In the optical disc 21A, the material data constituting the editing result recorded therein, which is in accordance with the edit list recorded therein, are combined. The VO data of the predetermined channel is rewritten onto the voice data of the predetermined channel included in the material data. The VO data may be recorded in an unrecording area in which nothing is yet recorded, i.e., an empty area selected from the recording areas of the optical disc 21A as the file in which the white package is integrated.

The broadcasting station 26 prepares a complete package serving as AV (Audio Video) data completed as a television program by performing finishing, such as by superimposing characters or figures utilizing the white package transmitted from the white package recording device 25.

When an optical disc 27 is loaded on the drive 25A, which is connected to the white package recording device 25, the white package recording device 25 may record the file in which the white package is integrated in an unrecording area of the optical disc 27.

In FIG. 1, the camcorders 21 and 22, the video editor unit 23, the VO adding device 24, and the white package recording device 25 each are configured as different devices, but it is also an embodiment of the present invention that some of them or all of them may be integrated into a single unit or one or more components.

In FIG. 1, the optical discs 21A and 22A are loaded on the internal drive or the external drive 23A of the video editor unit 23, reading or recording is performed on the optical discs 21A and 22A, but the video editor unit 23 is connected to the camcorder 21 on which the optical disc 21A is loaded and the video editor unit 23 is connected to camcorder 22 on which the optical disc 22A is loaded. The connection between video editor unit 23 and camcorders 21 and 22 may be via a network, or other transmission medium, such as a bus or wireless connection (transmission media not shown) and reading or recording may be performed on the optical discs 21A and 22A via the network or other transmission media.

Hereinafter, camcorders 21 and 22 may be collectively referred to as camcorder 20.

Figure 2:
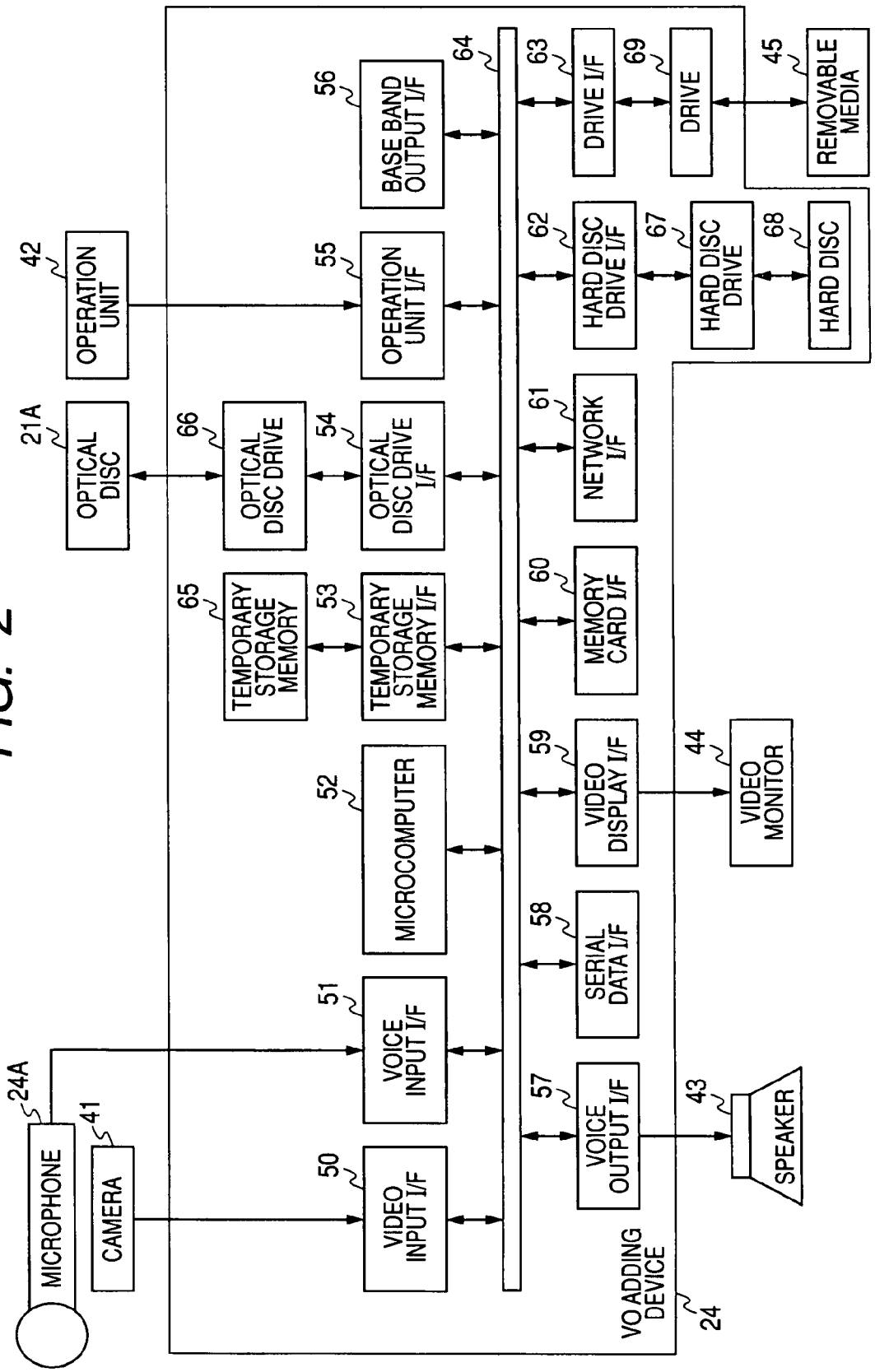
FIG. 2 is a block diagram illustrating an example of hardware of a voice over (VO) adding device.

FIG. 2 is a block diagram illustrating an example of hardware of the VO adding device 24 shown in FIG. 1.

In the VO adding device 24 shown in FIG. 2, a video input I/F 50, a voice input I/F 51, a microcomputer 52, a temporary storage memory I/F 53, an optical disc drive I/F 54, an operation unit I/F 55, a baseband output I/F 56, a voice output I/F 57, serial data I/F 58, a video display I/F 59, a memory card I/F 60, a network I/F 61, a hard disc drive I/F 62, a drive I/F 63 are connected to a system path 64 via an associated data path.

An external camera 41 is connected to the video input I/F 50 and a video signal acquired by photographing with a camera 41 is input from the camera 41. The video input I/F 50 supplies synchronizing signals such as a signal based on an SDI (Serial Digital Interface) standard, a composite signal, and a component signal included in the video signal to the video display I/F 59 via the system path 64 as video data.

The external microphone 24A is connected to the voice input I/F 51 and the voice signal serving as an analog signal of the VO acquired by the microphone 24A is input into to the voice input I/F 51. The voice input I/F 51 performs A/D (Analog/Digital) conversion for the voice signal and supplies the resultant acquired digital signal as the VO data to the temporary storage memory I/F 53 via the system path 64.

The microcomputer 52 includes a CPU (Central Processing Unit), a ROM (Read Only Memory), and a RAM (Random Access Memory). The CPU of the microcomputer 52 controls units of the VO adding device 24 with an operation signal from the operation unit I/F 55 in accordance with a program recorded in the ROM or the hard disc 68. Programs or data executed by the CPU are appropriately stored in the RAM.

The temporary storage memory 65 such as a buffer is connected to the temporary storage memory I/F 53. The temporary storage memory I/F 53 stores the VO data supplied from the voice input I/F 51 and the material data supplied from the optical disc drive I/F 54 in the temporary storage memory 65. The temporary storage memory I/F 53 reads the VO data stored in the temporary storage memory 65 and supplies the read VO data to the optical disc drive I/F 54 via the system path 64. As a result, the VO data is recorded in the optical disc 21A.

The temporary storage memory I/F 53 supplies the voice data of the material data recorded in the temporary storage memory 65 to the voice output I/F 57 via the system path 64 and supplies the video data to the video display I/F 59 via the system path 64. As the result, the material data recorded in the optical disc 21A is reproduced while being buffered to the temporary storage memory 65.

The optical disc drive 66 loaded on the optical disc 21A is connected to the optical disc drive I/F 54. The optical disc drive I/F 54 controls the optical disc drive 66, reads the material data by seeking a pick-up (not shown) provided in the optical disc drive 66 to a predetermined position on the optical disc 21A, and supplies the read material data to the temporary storage memory I/F 53 or the baseband output I/F 56 via the system path 64. The optical disc drive I/F 54 controls the optical disc drive 66 and records the VO data supplied from the temporary storage memory I/F 53 in the optical disc 21A.

An operation unit 42 such as a reception unit, or a receiver, receiving a command transmitted from a keyboard, a mouse, (or other input device, such as trackball etc.) and a remote controller provided in external positions is connected to the operation unit I/F 55. The operation unit I/F 55 generates the operation signal by operation of the operation unit 42 by the user and supplies the operation signal to the microcomputer 52 via the system path 64.

The baseband output I/F 56 sets the material data from the optical disc drive I/F 54 as a baseband and outputs it to an FPU device or an SNG device (described above).

An external speaker 43 is connected to the voice output I/F 57. The voice output I/F 57 performs D/A (Digital/Audio) conversion for the voice data supplied from the temporary storage memory I/F 53 and amplifies the resultant acquired analog signal to supply the analog signal to the speaker 43. The speaker 43 outputs voice on the basis of the analog signal supplied from the voice output I/F 57. The voice output I/F 57 typically supplies the voice data to the speaker 43. The speaker 43 performs D/A conversion and outputs the voice on the basis of the resultant acquired analog signal.

The serial data I/F 58 transmits and receives data to/from a digital apparatus such as an external computer (not shown) as needed. An external video monitor 44 is connected to the video display I/F 59. The video display I/F 59 performs D/A conversion for the video data supplied from the temporary storage memory I/F 53 and amplifies analog signals such as the resultant acquired composite signal and component signal to supply the analog signal to the video monitor 44. The video monitor 44 displays video on the basis of the analog signal supplied from the video display I/F 59. The voice and a time code corresponding to the video may be displayed on the video monitor 44.

The video display I/F 59 typically supplies the video data to the video monitor 44. The video monitor 44 performs D/A conversion and may output the video on the basis of the resultant acquired analog signal.

The memory card I/F 60 reads and writes the video data, the voice data, and various set-up data with respect to a memory card (not shown) loaded on the VO adding device 24. The network I/F 61 transmits and receives data to/from other devices connected thereto via a network such as Internet or a local area network (LAN), or wide area network (WAN), or Ethernet as needed.

For example, the network I/F 61 acquires programs from the other devices via the network and records the acquired programs in the hard disc 68 via the system path 64, the hard disc drive I/F 62, and the hard disc drive 67.

The hard disc drive 67 loaded with the hard disc 68 is connected to the hard disc drive I/F 62. The hard disc drive I/F 62 controls the hard disc drive 67, and reads and writes data from/to the hard disc 68. For example, the hard disc drive I/F 62 controls the hard disc drive 67 and records the programs supplied via the network I/F 61 and the system path 64 in the hard disc 68.

A drive unit 69 is connected to the drive I/F 63. The drive I/F 63 controls the drive unit 69 and drives the drive unit 69 when a magnetic disc, an optical disc, a magneto-optical disc, or removable media 45 such as a semiconductor memory is loaded on the drive unit 69 and acquires programs or data recorded therein. The acquired programs or data are transmitted to and recorded in the hard disc 68 via the hard disc drive I/F 62 as needed.

The system path 64 intermediates transmission and reception of data between the units connected thereto via the data path.

In the VO adding device 24 shown in FIG. 2, the microcomputer 52 executes a predetermined program and other functions as a VO processing unit adding the VO.

Figure 3:
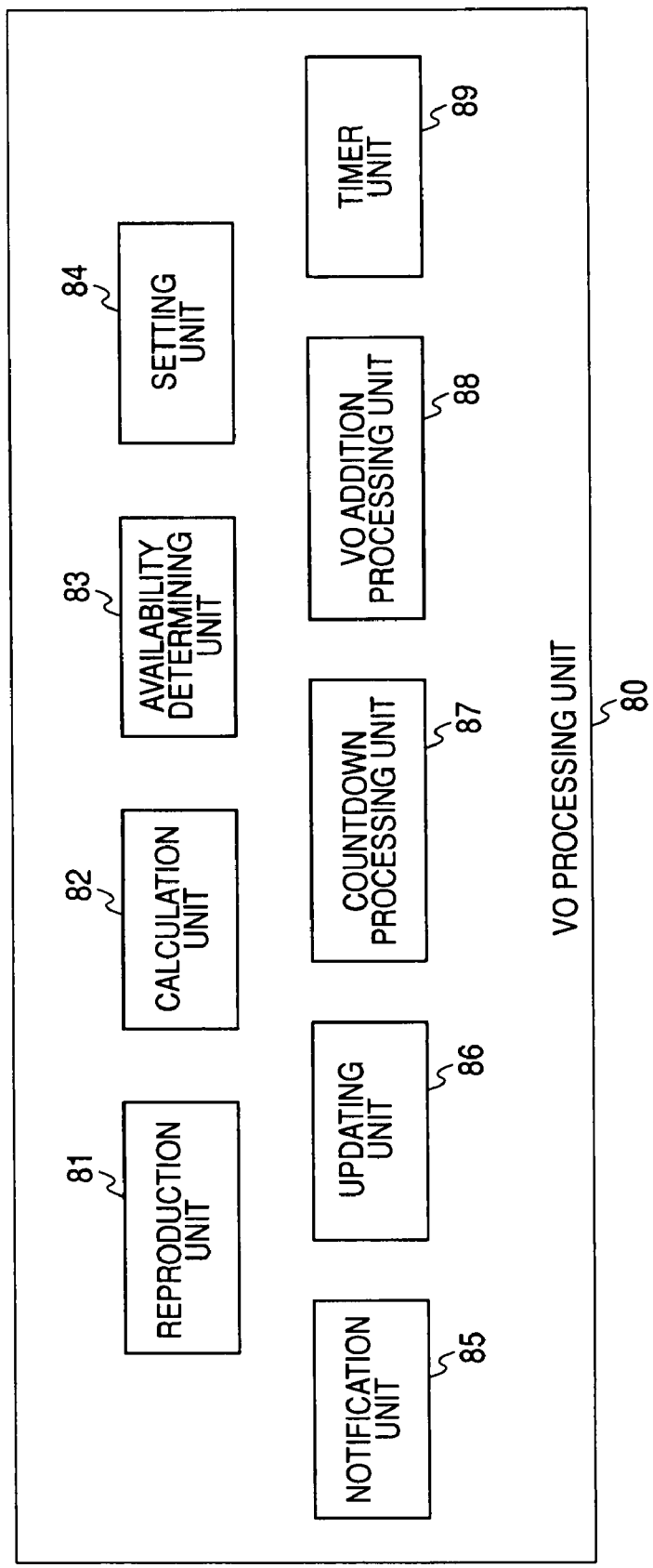
FIG. 3 is a block diagram illustrating an example of a VO adding device according to an embodiment of the present invention.

FIG. 3 illustrates an example of a VO processing unit 80.

The VO processing unit 80 of FIG. 3 includes a reproduction unit 81, a calculation unit 82, an availability determining unit 83, a setting unit 84, a notification unit 85, an updating unit 86, a countdown processing unit 87, a VO addition processing unit 88, and a timer unit 89.

The reproduction unit 81 controls the optical disc drive I/F 54 (shown in FIG. 2). The reproduction unit 81 reads the edit list from the optical disc 21A (shown in FIG. 1) loaded on the optical disc drive 66 (shown in FIG. 2) and supplies the read edit list to the setting unit 84 and the updating unit 86. The reproduction unit 81 controls the optical disc drive I/F 54 (shown in FIG. 2) and reads the material data from the optical disc 21A (shown in FIG. 1) at a predetermined time on the basis of time information representing a time, which is supplied from the timer unit 89, a reproduction condition supplied from the setting unit 84, and a countdown time at which the countdown processing unit 87 performs countdown.

The reproduction unit 81 controls the temporary storage memory I/F 53 (shown in FIG. 2) and stores the read material data in the temporary storage memory 65 (shown in FIG. 2). The reproduction unit 81 controls the temporary storage memory I/F 53 (shown in FIG. 2), the voice output I/F 57 (shown in FIG. 2), and the video display I/F 59 (shown in FIG. 2) and reproduces the material data stored in the temporary storage memory 65 (shown in FIG. 2) at a predetermined timing based on the time information and the countdown time. At this time, the reproduction unit 81 commands starting of temporary storage of the VO data to the VO addition processing unit 88.

The calculation unit 82 is supplied from the setting unit 84 calculates a minimum reproduction delay time which is a minimum value of a reproduction delay time from starting to read the material data from the optical disc 21A (shown in FIG. 1) to starting to reproduce the material data, which is required to reproduce the material data in real time on the basis of various reproduction conditions applied to at the time of reproducing the optical disc 21A to supply the minimum reproduction delay time to the available determining unit 83.

The availability determining unit 83 determines whether or not an editing result corresponding to the edit list read by the reproduction unit 81 is reproduced in real time on the basis of the countdown time supplied from the setting unit 84 and the minimum reproduction delay time supplied from the calculation unit 82. The availability determining unit 83 supplies the determination result to the notification unit 85.

The setting unit 84 sets a count time and supplies the count time to the reproduction unit 81 and the availability determining unit 83 on the basis of the operation signal supplied from the operation unit I/F 55. The setting unit 84 sets various reproduction conditions applied at the time of reproducing the optical disc 21A and supplies the reproduction conditions to the reproduction unit 81 and the calculation unit 82. The reproduction conditions includes a required reproduction rate, a reading rate at the time of reading data from the optical disc 21A, an available storage capacity, a seek time function, media access information, and other similar functionality.

Here, the required reproduction rate represents a required reproduction rate which the user requires at the time of performing reproduction. The user designates the required reproduction rate by operating the operation unit 42. The operation signal corresponding to the operation is supplied to the setting unit 84 via the operation unit I/F 55 and the system path 64. The setting unit 84 sets the required reproduction rate as one reproduction condition on the basis of the operation signal.

The reading rate is stored in the optical disc drive 66 and is supplied from the optical disc drive 66 to the setting unit 84 via the optical disc drive I/F 54 and the system path 64. Accordingly, the reading rate is set as one reproduction condition.

The available storage capacity represents a size permitted by the user as the total storage capacity of the temporary storage memory 65 or a size permitted in the VO adding device 24. The user can input the available storage capacity by operating the operation unit 42. However, since a maximum value of the available storage capacity is predetermined a specification and a performance of the VO adding device 24, the user can input a value equal to or less than the maximum value.

The seek time function represents a function representing a seek time, or search time, required for performing seek, or search from an original seek logic block which is any one logic block of the optical disc 21A to a logic block of a seek destination which is the other logic block, for example, a logic block of a seek destination and a logic block number (LBN (Logical Block Number) of the logic block of the seek destination as a factor.

In other words, for example, a recording area of the optical disc 21A is partitioned by logic blocks (physical blocks allocated to the logic block) having a predetermined size and the LBNs as sequential numbers are applied to the logic blocks block in a sequence of reading and writing from/into the optical disc 21A. When two LBNs are applied as the factor, the original seek logic block is used as one logic block selected from two logic blocks specified by the two LBNs and the logic block of the seek destination is used as the other logic block. It is also possible to acquire a seek time required for seek as the logic block of the seek destination from the original logic block in accordance with the seek time function.

Here, the seek time acquired by the seek time function represents the worst-case value (most time required) of the seek time required for seek from the original seek logic block to the logic block of the seek destination and includes even a revolution standby time of the optical disc 21A. The seek time function is stored in the optical disc drive 66 and is supplied from the optical disc drive 66 to the setting unit 84 via the optical disc drive I/F 54 and the system path 64. Accordingly, the seek time function is set as one reproduction condition.

The media access information represents a sequence in which the data recorded in the optical disc 21A is read. In other words, in the optical disc 21A, a series of data may not be recorded in one successive recording area and are generally recorded in a plurality of successive recording areas, that is, are segmentally recorded therein. The media access information represents a sequence to access the recording area in which the data are segmentally recorded in the optical disc 21A. The media access information is acquired on the basis of the edit list reproduced by the reproduction unit 81.

In other words, the setting unit 84 controls the optical disc drive I/F 54, reads information for managing data recorded in the optical disc 21A from the optical disc 21A, recognizes the recording area of the optical disc 21A in which data serving as a reproduction target is recorded, and performs scheduling of arranging the recording area in a reproduction sequence of the data, thereby acquiring the media access information in a reading sequence of the material data in accordance with the edit list. The setting unit 84 sets the media access information as one reproduction condition.

The notification unit 85 prepares video data for displaying a message representing a determination result in accordance with the determination result supplied from the availability determining unit 83. The notification unit 85 supplies the video data to the video display I/F 59 and displays the message on the video monitor 44, thereby notifying the determination result to the user.

The updating unit 86 controls the optical disc drive I/F 54 and updates the edit list recorded in the optical disc 21A on the basis of the edit list judged by the reproduction unit 81 and UMID information applied to the VO data supplied from the VO addition processing unit 88.

The countdown processing unit 87 commands the timer unit 89 to start clocking of a time when the operation signal corresponding to a command for starting addition of the VO is supplied from the operation unit I/F 55. The countdown processing unit 87 controls the video display I/F 59 and performs countdown display on the basis of time information supplied from the timer unit 89.

The VO addition processing unit 88 controls the voice input I/F 51 and the temporary storage memory I/F 53 in accordance with a command from the reproduction unit 81 and temporarily stores the VO data corresponding to voice input into the microphone 24A in the temporary storage memory 65. The VO addition processing unit 88 controls the temporary storage memory I/F 53 and the optical disc drive I/F 54, and adds the VO data temporarily stored in the temporary storage memory 65 to the editing result corresponding to the edit list read by the reproduction unit 81. The VO addition processing unit 88 supplies the UMID information applied to the VO data to the updating unit 86.

The timer unit 89 starts clocking a time in accordance with a command from the countdown processing unit 87. The timer unit 89 supplies time information representing a clocking time to the reproduction unit 81 and the countdown processing unit 87.

Figure 4:
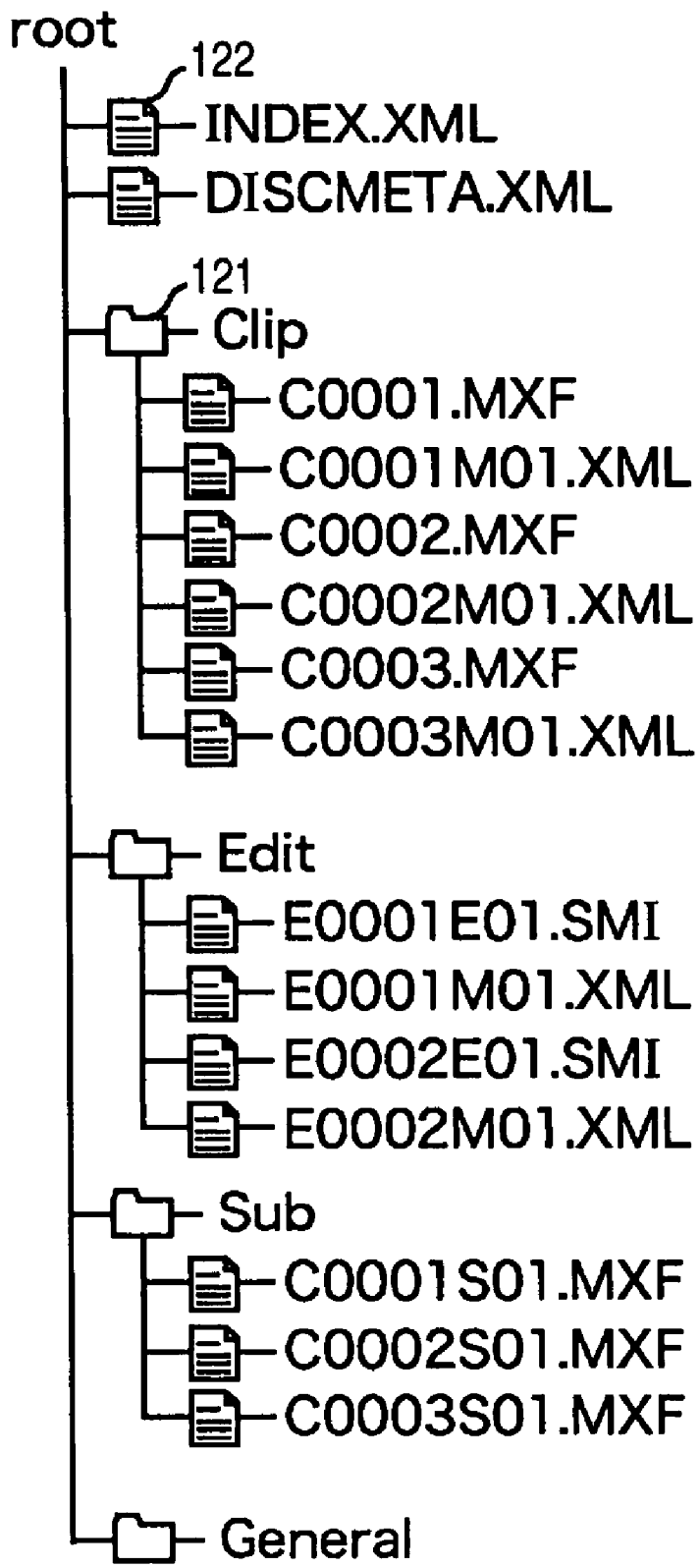
FIG. 4 illustrates an example of a directory of a file recorded in an optical disc before adding VO according to an embodiment of the present invention.

FIG. 4 illustrates an example of a directory of a file recorded in the optical disc 21A before adding the VO.

In FIG. 4, symbol 121 represents one directory. Although reference numerals and signs are not given to other symbols, the other symbols similar to symbol (directory) 121 also represent one directory. Symbol 122 represents one file. Although reference numerals and signs are not given to other symbols, the other symbols similar to symbol (directory) 122 also represent one file.

Hereinafter, for purposes of describing FIG. 4, it is regarded that the directories are the same as the symbols of the directories for description. Similarly, it is regarded that the files are the same as the symbols of the files for description. The names of the directories and the names of the files each are written in parentheses ( ) at the back of the files or the directories for easy discrimination of the directories and the files.

FIG. 4 shows index file (INDEX.XML) 122 serving as a data file describing a table of contents, which describes information for managing a clip (a detailed description thereof will be described later) and the edit list and a disc meta file (DISCMETA.XML) serving as a file of a disc metadata, which describes a path of a representative image and titles or comments of the optical disc 21A are provided in the optical disc 21A.

A clip directory (Clip) 121 in which files of material data of the clips are provided in a low directory, an edit list directory (Edit) in which files of the edit list are provided in a low directory, and a proxy directory (Sub) in which files of proxy video data (a description thereof will be described later) are provided in a low directory are provided in the optical disc 21A.

The material data of the clips recorded in the optical disc 21A are recorded in the clip directory (Clip) 121 with different files for each clip.

The clip represents the unit of the number of photographing processes of the camcorder 20 (shown in FIG. 1). In addition, the clip represents the unit indicating a time from starting to ending of the photographing process, the unit indicating lengths of various data acquired by the photographing process, or the unit indicating an amount of data of various data acquired by the photographing process. The clip may represent a collectivity of various data.

For example, the clip represents a collection of video data acquired by one photographing process (photographing process from photographing starting to photographing ending), voice data corresponding to the video data, and metadata.

Specifically, for example, FIG. 4 illustrates a case in which data of three clips are recorded in the optical disc 21A.

For example, a first clip file (C0001.MXF) serving as material data of a first clip recorded in the optical disc 21A and a first non-real time metadata file (C0001M01.XML) serving as a file including metadata (hereinafter, referred to as non-real time metadata) in which a real-time property is not required, which corresponds to the material data of the clip are provided below the clip file directory 121.

In the example of FIG. 4, the non-real time metadata file (C0001M01.XML) is described in an XML type so as to have generality.

Similarly to the first clip file (C0001.XMF) and the first non-real time metadata file (C0001M01.XML), a second clip file (C0002.XMF) and a second non-real time metadata file (C0002M01.XML), and a third clip file (C0003.XMF) and a third non-real time metadata file (C003M01.XML) are provided in the low directories of the clip directory 121.

In FIG. 4, the edit list recorded in the optical disc 21A is recorded in the edit directory (Edit) shown in the low directories of the clip directory (Clip) 121 with different files for each editing process.

For example, in the example of FIG. 4, a first edit list file (E0001E01.SMI) which is a file including the edit list serving as information on an editing result of a first editing process recorded in the optical disc 21A and a first edit list metadata file (E0001M01.XML) which is a file including corresponding to material data (a part extracted as material data after editing out of material data of all the clips used for editing) after editing or metadata newly generated on the basis of the metadata are provided in the low directories of the edit directory (Edit).

Similar to the first edit list file (E0001E01.SMI) and the first edit list metadata file (E0001M01.XML), a second edit list file (E0002E11.SMI) corresponding to a second editing process of the clip recorded in the optical disc 21A and a second edit list metadata file (E0002M01.XML) are provided in the low directories of the edit directory.

In FIG. 4, the proxy video data of the clip recorded in the optical disc 21A is recorded in the proxy directory (Sub) shown in the low directories of the edit directory (Edit) with different files for each clip. Here, the proxy video data represents data acquired by lowering resolution of the video data of the clip.

For example, in the example of FIG. 4, a first proxy video file (C0001S01.MXF) serving as a proxy video data file of a first clip recorded in the optical disc 21A, a second proxy video file (C0002S01.MXF) serving as a proxy video data file of a second clip, and a third proxy video file (C0003S01.MXF) serving as a proxy video data file of a third clip are provided in the low directories of the proxy directory (Sub).

General directories in which files other than the clips are provided are provided in the optical disc 21A.

Figure 5:
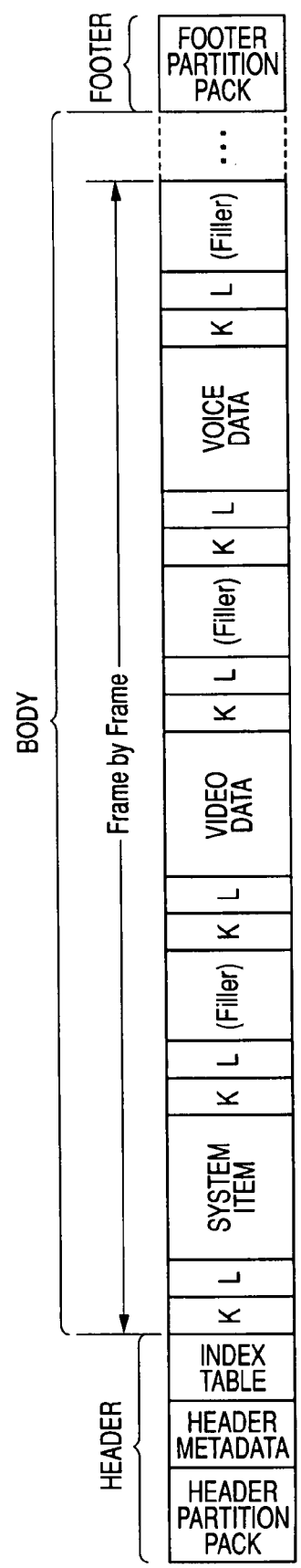
FIG. 5 illustrates an example of a format of a clip file according to an embodiment of the present invention.

FIG. 5 illustrates an example of a format of the clip file shown in FIG. 4.

For example, FIG. 5 shows a format when video data coded in an MPEG (Moving Picture Experts Group) 2 format and voice data of a linear PCM (Pulse Code Modulation) format are employed as material data disposed in a body.

In addition, video data and voice data of various formats such as a DV (Digital Video) may be disposed.

As shown in FIG. 5, a system item in which metadata (hereinafter, referred to as real-time metadata) in which a real-time property for one frame is required is disposed, the video data coded in the MPEG2 format, and the voice data coded in the linear PCM format for one clip are collectively disposed in the body, and a header or a footer are added to the body, thereby forming the clip file.

Here, the system item, the video data, and the voice data are KLV-coded so as to have a KLV (Key, Length, and Value) structure and they are disposed in the body.

The KLV structure represents a structure in which the key, the length, and the value are sequentially disposed from the header. A 16-byte label based on a standard of SMPTE 298M representing a type of data disposed in the value is disposed in the key. A length of the data disposed in the value is disposed in the length. Here, actual data, that is, a system item in which real-time metadata of one frame is disposed, video data, or voice data is here disposed in the value.

The KLV-coded system item, video data, and voice data have a fixed length based on a KAG (KLV Alignment Grid) as the length of the data. The KLV-coded system item, video data, and voice data have the fixed length as the length of the data and fillers as data for stuffing also have the KLV structure and thus, they are disposed in the rear of the KLV-coded system item, video data, and voice data, respectively.

A header partition pack, header metadata, and an index table are sequentially disposed in the header from the head. Partition metadata serving as data representing a file format (for example, an MXF (Material eXchange Format)) a length of the body, a starting position of the body, and data representing a type of data (a coding format) disposed in the body are disposed in the header partition pack. For example, a UMID (Unique Material Identifier), a head time code, a file preparing data, or information (for example, the number of pixels of the video, an aspect ratio, and the like) on data disposed in the body is disposed in the header metadata.

The UMID indicates an identifier determined by SMPTE (Society of Motion Picture and Television Engineers) as a unique clip identifier for uniquely identifying the clips or the VO data in the global. Data having various options can be disposed in the header.

Data, which is used for managing the data disposed in the body, is disposed in the index table. The footer includes a footer partition pack and data used for specifying the footer is disposed in the footer partition pack.

FIG. 6 illustrates the edit list of the edit list file recorded in the optical disc 21A before adding the VO.

For example, FIG. 6 illustrates a detailed description example of the edit list file described in XML. In FIG. 6, numerals of line heads are applied for a convenient description and are not a part of an XML description. This is the same as in FIG. 14.

The edit list file represents a file including an edit list serving as information on an editing result of non-destructive editing of the clip and describes a reproduction method of the editing result.

As shown in FIG. 6, the XML description of the edit list file is formed by a body part surrounded chiefly by a body tag (<body></body>). In an example of FIG. 6, the body part is described in lines 4 to 15. Information representing that the file is an edit list of a professional disc is described in lines 1 to 3.

Specifically, information relating to a time-based behavior of the editing description is described in the body part. In the example of FIG. 6, a par element described between a start tag "<par>" in line 5 and a end tag "</par>" in line 14 represents a time container and defines a simple time group reproducing a plurality of elements simultaneously. In the example of FIG. 6, the first clip (in the example of FIG. 6, described as Clip1 and for example, also referred to as a clip of the first clip file (COOO1.MXF) shown in FIG. 4) and the second clip (in the example of FIG. 6, described as Clip2 and for example, also referred to as a clip of the second clip file (C0002.MXF) shown in FIG. 4) are reproduced simultaneously.

However, in the example of FIG. 6, as described below, reproduction times of the two clips do not match each other and actually, the two clips are successively reproduced.

In FIG. 6, a reference file and a reproduction scope of the reference file are described in a ref element described in lines 7 to 9. A description of "src="urn:smpte:umid: 060A2B340101010501010D431300000070D30200093505-970 80046020118F454"" in line 7 represents that an UMID allocated to a file of a reference destination is "060A2B340101010501010D431300000070D3020009350-597080046020118F454".

A description of "clipBegin="smpte-30=00:00:00:00"" in line 8 represents a position starting reproduction of the first clip, that is, a starting position of an editing sector on a FTC (Film Time Code) of the first clip and the unit is set to the number of frames. The FTC represents relative position information sequentially allocated to each of the frames from a head frame by setting a head frame number of each file to "0". A description of "clipEnd="smpte-30=00:00:06:00"" in line 8 followed by the description represents a position ending reproduction of the first clip, that is, an ending position of the editing sector on the FTC of the first clip.

A description of "begin="smpte-30=00:00:00:00"" in line 8 followed by the description represents a time starting the first clip, that is, a position on the FTC of the edit list in which the material data is started and the unit is set to the number of frames. A description of "smpte-30" represents that an SMPTE time code of 30 frames/second, which is defined as SMPTE is used as a time code.

A description of "trackSrc="CH1;CH2;CH3;CH4"" in line 9 represents a channel number of a channel (hereinafter, referred to as a reproduction channel) corresponding to voice data serving as a reproduction target out of voice data of each of channels included in the first clip. Hereinafter, the number of channels of reproducible voice data is set to 4 and the voice data having four channels is included in the clip.

A description of "trackDst="CH1;CH2;CH3;CH4"" in line 9 followed by the description represents that the voice data of the reproduction channel is output as voice data of a channel corresponding to any channel number is output, that is, a channel number of a channel (hereinafter, referred to as an output channel) in which the voice data is output.

As described above, in the example of FIG. 6, it is described in the edit list that reproduction of the first clip is started at a position of frame number "00:00:00:00" and the reproduction of the first clip is ended at a position of frame number "00:00:06:00" at time "00:00:00:00". At this time, voice data of all the channels included in the first clip are reproduced as voice data of the same channels thereas.

The second clip is described in lines 11 to 13 similarly to the first clip. In the example of FIG. 6, it is described in the edit list that reproduction of the second clip is started at a position of frame number "00:00:00:00" and the reproduction of the second clip is ended at a position of frame number "00:00:04:00" at time "00:00:06:00". At this time, similarly to the first clip, voice data of all the channels included in the second clip are reproduced as voice data of the same channels thereas.

In the edit list of FIG. 6, the reproduction of the first clip and the reproduction of the second clip are designated to be performed simultaneously by a par element. Accordingly, the first clip is reproduced at from a position of frame number "00:00:00:00" to a position of frame number "00:00:06:00" at time "00:00:00:00". By this configuration, the second clip is reproduced at from a position of frame number "00:00:00:00" to a position of frame number "00:00:04:00" at time "00:00:06:00". As described above, in the edit list shown in FIG. 6, the first clips and the second clips are edited to be successively reproduced.

Thus, the edit list of FIG. 6 represents that the first clip (Clip 1) is reproduced for 6 seconds and then, the second clip (clip 2) is reproduced for 4 seconds.

Although the example of UMIDs for data shown in FIG. 6 is described as above, the UMIDs indicate only the description positions of the UMIDs in the edit list, and the UMIDs are virtual UMIDs of which values do not have any meaning. In other words, the UMIDs shown in FIG. 6 are combinations of meaningless symbols which are different from actually used UMIDs, and appropriate UMIDs which are generated on the basis of a method determined by SMPTE are actually described in the positions of the above-described virtual UMIDs instead of the above-described virtual UMIDs.

Next, a minimum reproduction delay time will be described with reference to FIGS. 7A and 7B, 8A and 8B, and 9A and 9B.

Reproduction of material data constituting an editing result at a reproduction time of 0 second will be described with reference to FIGS. 7A and 7B.

Figures 7A, 7B:
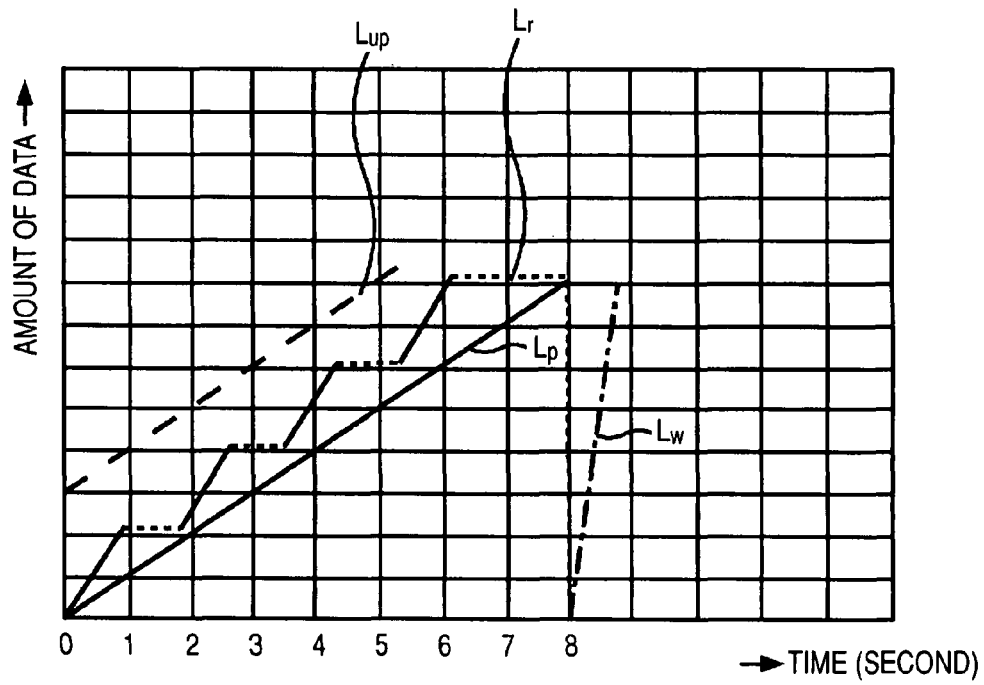
FIGS. 7A and 7B are diagrams illustrating a minimum reproduction delay time according to an embodiment of the present invention.

A table shown in FIG. 7A illustrates examples of information on period or times of processes performed at the time of reproducing the material data constituting the editing result.

Specifically, items "Processing Contents", "Processing Periods", "Processing starting time", "Reading Start Limit Time", and "Storage Period" are shown in a table of FIG. 7A and correspond to contents of the items, respectively. This is the same as in tables shown in FIGS. 8A and 9A.

The content of the item "Processing Contents" represents the content of the processes performed at the time of reproducing the material data constituting the editing result and is determined by the media access information. In the example of FIG. 7A, material data disposed in four positions separated from each other on the optical disk 21A are read and the seek, or search, is performs four times.

The content of the item "Processing Periods" represents a period needed for the content of the item "Processing Contents" corresponding thereto. Specifically, the content corresponding to the content "Material Data Reading" of the item "Processing Contents" out of the content of the item "Processing Periods" is determined by a reading rate, which is set to 0.8 seconds in the example of FIG. 7A. Here, in the example of FIG. 7A, the reading rate is set to 2.5×. Accordingly, when the reading rate of the material is set to 1×, a reproduction period of material data read for 0.8 seconds is 2 seconds. On the other hand, the content corresponding to the content "Seek" of the item "Processing Contents" in the content of the item "Processing Periods" is determined by the seek time function. In the example of FIG. 7A, the content corresponding to the first to third seeks is 1 second and the content corresponding to the fourth seek is 1.8 seconds.

The content of the item "Processing Start Times" is a start time of the content corresponding to the content of the item "Processing Consents" corresponding to the content of the item "Processing Start Times" and is determined by setting the reproduction starting time to 0 accumulating the contents of each "Processing Periods" thereafter. In the example of FIG. 7A, since the reproduction delay period is 0, the reproduction starting time is the same as the starting time of the first material data reading and the content of the item "Processing Start Times" corresponding to the first "Material Data Reading" of the content of the item "Processing Contents" is 0.

The content of the item "Reading Start Limit Time" represents a limit time at which reading of the material data is performed so as to perform reproduction at a predetermined required reproduction rate and is determined by the required reproduction rate. In the example of FIG. 7A, the required reproduction rate is set to 1×. Accordingly, since the reproduction period of the material data read for 0.8 seconds is 2 seconds, the limit time at which the reading of the material data is performed is 2 seconds after the limit time at which the preceding reading is performed.

The content of the item "Storage Period" represents a period of from a processing start time to a reading limit time of a process serving as the content of the item "Processing Contents" corresponding to the content of the item "Storage Period". Specifically, the content corresponding to the content "Material Data Reading" of the item "Processing Contents" in the content of the item "Storage Period" represents a period of from the content of the item "Processing Start Times" to the content of the item "Reading Start Limit Time". The content corresponding to the content "Seek" of the item "Processing Contents" in the content of the item "Storage Period" represents a period of the content of the item "Processing Start Time" to the content of the item "Reading Start Limit Time" corresponding to the content "Material Data Reading" following the item "Processing Contents". Accordingly, when the content of the item "Storage Period" represents a negative period, an underflow occurs in the temporary storage memory 65.

As described above, in the example of FIG. 7A, after first material data reading is performed for 0.8 seconds (0.8 seconds after the first reading is started), the seek operation, or function, is performed for 1 second. Then, after second material data reading is performed for 0.8 seconds, the seek operation is performed for 1 second. Then, after third material data reading is performed for 0.8 seconds, the seek operation is performed for 1 second. Finally, after fourth material data reading is performed for 0.8 seconds, the seek operation is performed for 1.8 seconds.

At this time, an amount of data read from the optical disc 21A and input into the temporary storage memory 65 is indicated by a media reading line Lr shown in a graph of FIG. 7B. In FIG. 7B, a horizontal axis represents a time (in seconds) and a vertical axis represents an amount of data. This is the same as in FIGS. 8B and 9B.

In the example of FIG. 7A, since the required reproduction rate is set to 1× and the reading rate is set to 2.5×, an amount of material data output from the temporary storage memory 65 is indicated by a real-time reproduction line Lp shown in the graph of FIG. 7B.

In FIGS. 7A and 7B, since the reproduction delay time is 0 second, start times of the media reading line Lr and the real-time reproduction line Lp are the same as each other and are set to 0 second.

As described above, the real-time reproduction line Lp represents the amount of the material data output from the temporary storage memory 65 and the media reading line Lr represents the amount of the material data read from the optical disc 21A and input into the temporary storage memory 65. Accordingly, the real-time reproduction line Lp is above the media reading line Lr representing occurrence of the underflow in the temporary storage memory 65. The underflow of the temporary storage memory 65 represents interruption of the reproduction.

In the examples of FIGS. 7A and 7B, since the real-time reproduction line Lp is generally below the media reading line Lr, it is possible to reproduce the material data in real time without the interruption of the reproduction. When the VO data is input into the temporary storage memory 65 via the microphone 24A, the voice input I/F 51, the system path 64, and the temporary storage memory I/F 53 just after the reproduction of the material data, an amount of the VO data input into the temporary storage memory 65 from the microphone 24A is indicated by a write line Lw shown in FIG. 7B.

In FIG. 7B, a memory upper-limit line Lup represents a temporal transition in total amount of an upper-limit value of an amount of data which can be stored in the temporary storage memory 65 and is shown by a broken line upwardly moving in parallel with the real-time reproduction line Lp.

As described above, since the media reading line Lr represents the amount of the material data read from the optical disc 21A and stored in the temporary memory 65 and the memory upper-limit line Lup represents the upper-limit value of the amount of the data which can be stored in the temporary memory 65, that the memory upper-limit line Lup is below the media reading line Lr represents occurrence overflow of the temporary storage memory 65. The overflow of the temporary storage memory 65 represents the interruption of the reproduction.

In FIG. 7B, since the memory upper-limit line Lup is generally above the real-time reproduction line Lp, it is possible to reproduce the material data in real time without the interruption of the reproduction.

A method of preventing any memory upper-limit line Lup from being below the media reading line Lr includes a method of not reading the material data while performing a revolution standby (track jump) the optical disc drive 66. However, when the memory upper-limit line Lup is prevented from being below the media reading line Lr by this method, the media reading line Lr after prevention is shifted in a right direction. Accordingly, it is necessary to acquire the media reading line Lr.

A difference (a distance in a vertical axis direction between the memory upper-limit line Lup and the real-time reproduction line Lp) between the memory upper-limit line Lup and the real-time reproduction line Lp represents the available storage capacity out of the reproduction conditions set by the setting unit 84 shown in FIG. 3.

Alternatively, when the information on the periods and the times of the processes performed at the time of reproducing the material data constituting the editing result are shown in a table of FIG. 8A, the real-time reproduction line Lp is above the media reading line Lr as shown in a graph of FIG. 8B.

Thus, in examples of FIGS. 8A and 8B, material data disposed in positions separated from each other on the optical disk 21A are read eight times and the seek operation is performed seven times.

Specifically, in the examples of FIGS. 8A and 8B, after the first material data reading is performed for 0.4 seconds (0.4 seconds after the first reading is started), the seek operation is performed for 1 second. Then, after the second material data reading is performed for 0.4 seconds, the seek operation is performed for 1 second. Then, after the third material data reading performed for 0.4 seconds and the seek operation performed for 1 second are performed five times. Then, eighth material data reading is performed for 0.4 seconds. Consequently, the media reading line Lr is shown in the graph of FIG. 8B.

In the examples of FIGS. 8A and 8B, since the required reproduction rate is set to 1× and the reading rate is set to 2.5× similarly to the examples of FIGS. 7A and 7B. Accordingly, the real-time reproduction line Lp is shown in the graph of FIG. 8B.

Thus, in the examples of FIGS. 8A and 8B, since the reproduction delay time is 0 seconds, the reproduction start time is the same as the first material data reading start time, that is, the start times of the media reading line Lr and the real-time reproduction line Lp are the same as each other and are set to 0 seconds.

As a result, the content of the item "Storage Period" represents a negative period corresponding to −0.4 (=1-1.4) seconds in the content corresponding to the second "Material Data Reading".

In the examples of FIGS. 8A and 8B, the real-time reproduction line Lp and the media reading line Lr as shown in a graph of FIG. 8B represent a period of time from the start time of the first seek operation to the start time of the second material data reading. The real-time reproduction line Lp and the media reading line Lr intersect at an intersection point a corresponding to a time of 1 second after the reproduction start time and the real time reproduction line Lp is above the media reading line Lr. The temporary storage memory 65 is underflowed 1 second after the reproduction start time serving as the time corresponding to the intersection point α.

Accordingly, in this case, it is necessary to shift the real-time reproduction line Lp in the right direction so that the real-time reproduction line Lp is not above the media reading line Lr for assuring real-time reproduction of the material data. However, as the real-time reproduction line Lp is shifted in the right direction, the reproduction delay time increases.

Accordingly, it is necessary that the real-time reproduction line Lp is shifted in an utmost left direction so as not to be above the media reading line Lr for assuring the real-time reproduction by shortening the reproduction delay time as possible. As shown in FIG. 9B, it is possible to shorten the reproduction delay time as possible by setting the reproduction delay time so as to the real-time reproduction line Lp intersects the media reading line Lr at one or more point from the bottom. The reproduction delay time is the minimum reproduction delay time Tw which is the minimum reproduction delay time required for the real-time reproduction.

As shown in FIG. 9B, the reproduction delay time is set to the minimum reproduction delay time Tw, the information on the processing periods or times at the time of reproducing the material data constituting the editing result is shown in a table of FIG. 9A.

In the table of FIG. 9A, the content of the item "Processing Start Times" corresponding to the first "Material Data Reading" of the content of the item "Processing Content" includes "−2.8 seconds" representing a time of 2.8 second before the reproduction delay time and the content of the item "Processing Start Times" corresponding to the content of the following item "Processing Contents" includes a time of 2.8 seconds before the corresponding content shown in the table of FIG. 8A.

Accordingly, in the table of FIG. 9A, the content of the item "Storage Period" includes a time adding 2.8 seconds to the content of the item "Storage Period" shown in the table of FIG. 8A. In other words, the underflow does not occur in the temporary storage memory 65.

Accordingly, in this case, as shown in FIG. 9B, the real-time reproduction line Lp is generally below the media reading line Lr and the memory upper-limit line Lup is generally above the media reading line Lr, reproduce the material data in real time without the interruption of the reproduction. As shown in FIG. 9B, the system stores several seconds in advance the lines on graph 9B show that a minimum time is calculated by the system before playing back the scene.

When the VO data is input into the temporary storage memory 65 via the microphone 24A, the voice input I/F 51, the system path 64, and the temporary storage memory I/F 53 just after the reproduction of the material data, an amount of the VO data input into the temporary storage memory 65 from the microphone 24A is indicated by a write line Lw shown in FIG. 9B.

Figure 10:
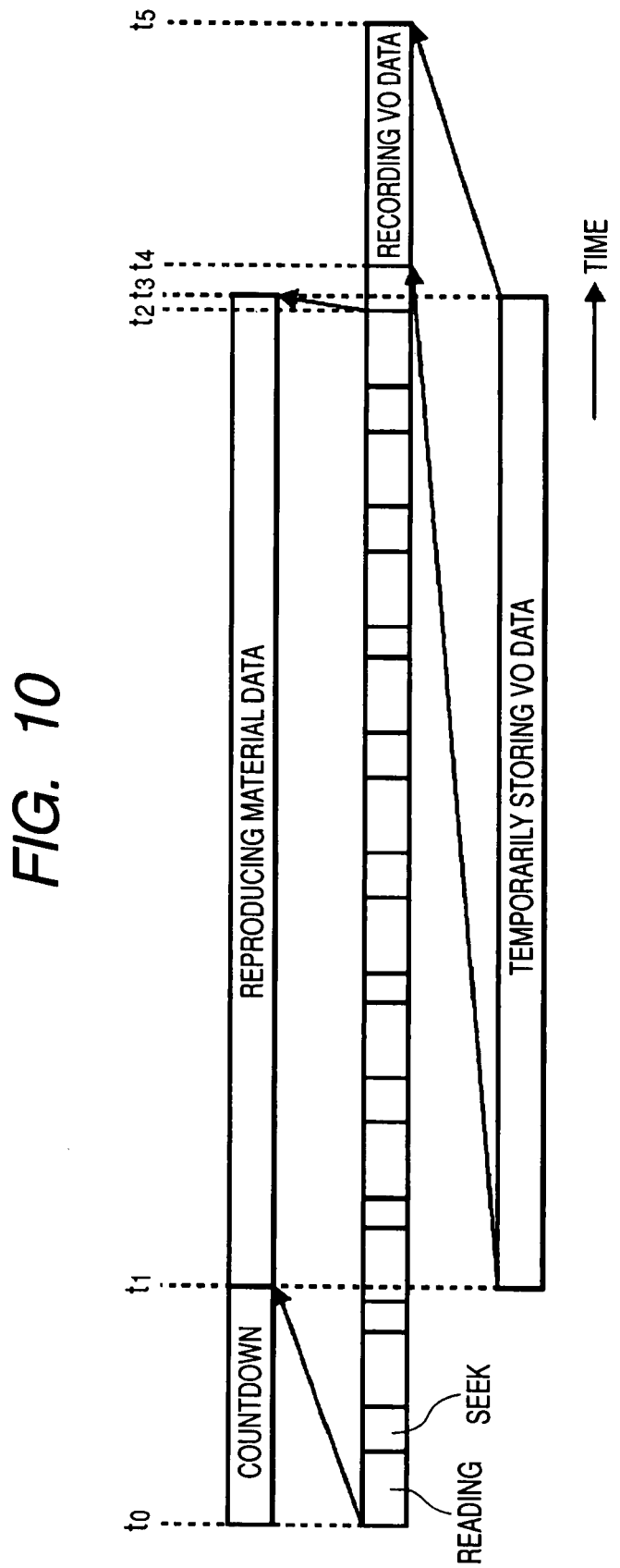
FIG. 10 is a diagram illustrating a timing chart at a time of adding VO according to an embodiment of the present invention.

FIG. 10 illustrates a timing chart when the VO processing unit 80 adds the VO. A horizontal axis shown in FIG. 10 represents a time (in seconds).

In the example shown in FIG. 10, when a command for starting addition of the VO is given by the user at a time t0, the countdown processing unit 87 starts the countdown display on the basis of the time information supplied from the timer unit 89 and the reproduction unit 81 starts the reading of the material data constituting the editing result corresponding to the edit list from the optical disc 21A (shown in FIG. 1) on the basis of the time information supplied from the timer unit 89, the reproduction conditions supplied from the setting unit 84, and the countdown time. Then, the reproduction unit 81 repeats the reading of the material data and the seek operation alternatively.

At a time t1 after the countdown time from the time t0, when the countdown display is ended, the reproduction unit 81 starts the reproduction of the material data. In other words, the reproduction unit 81 controls the temporary storage memory I/F 53, reads the material data read from the optical disc 21A and the material data stored in the temporary storage memory 65, and supplies the voice data out of the material data to the voice output I/F 57 and supplies the video data to the video display I/F 59 to perform the reproduction of the material data.

At this time, the VO addition processing unit 88 controls the voice input I/F 51 and the temporary storage memory I/F 53 starts temporary storage of the VO data corresponding to the voice input into the microphone 24A to the temporary storage memory 65.

At a time t2, when the reproduction unit 81 ends the reading of all the material data constituting the editing result corresponding to the edit list, the reproduction unit 81 starts the seek of a pick-up (not shown) of the optical disc drive 66 to a position on the optical disc 21A in which the VO data is recorded.

At a time t3, when the reproduction unit 81 ends the reproduction of all the material data stored in the temporary storage memory 65, the VO addition processing unit 88 controls the temporary storage memory I/F 53 to end the temporary storage of the VO data into the temporary storage memory 65.

At a time t4, when the seek of the pick-up to the position in which the VO data is recorded is ended, the VO addition processing unit 88 controls the temporary storage memory I/F 53, and reads the VO data from the temporary storage memory 65, and the VO addition processing unit 88 controls the optical disc drive I/F 54 and records the VO data in the optical disc 21A.

As described above, when the command for starting the addition of the VO is given by the user, the countdown display is started and the reproduction of the material data is started just after the countdown display is ended. Accordingly, the user can know a timing at which the reproduction of the material data is started. As the result, it is possible to input the voice as the VO at a desired timing.

However, at the time t1 after the countdown time from the time t0, since it is necessary to start the reproduction of the material data, it is necessary to the countdown time is equal to or more than the minimum reproduction delay time Tw for the real-time reproduction of the material data.

Figure 11:
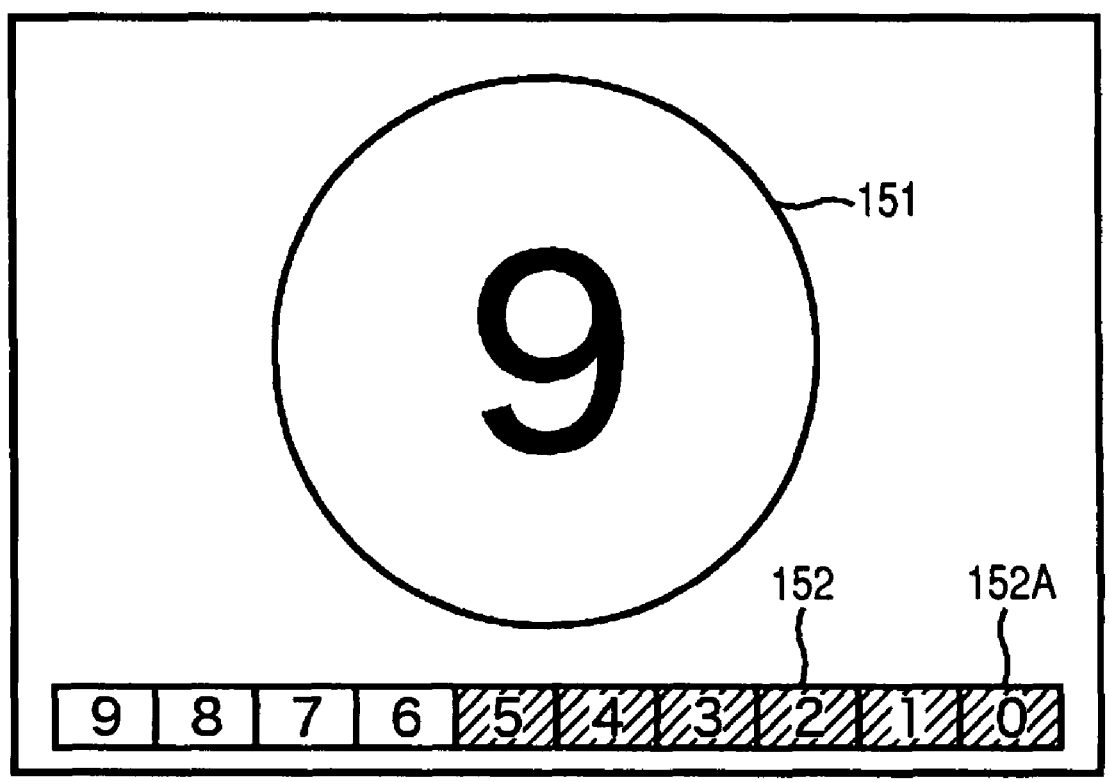
FIG. 11 is a diagram illustrating an example of a countdown display according to an embodiment of the present invention.

FIG. 11 illustrates a display example of the countdown display performed by the countdown processing unit 87 shown in FIG. 3. When a narration, such as comments by a newscaster or other VO is to be added, the system assists the narrator by describing the countdown in the window.

As shown in FIG. 11, the countdown processing unit 87 causes a 1 second unit display unit 151 and a 0.1 second unit display unit 152 to perform display so as to perform the countdown display.

A value is counted down and displayed on the one second unit display unit 151 every 1 second after the countdown display is started. For example, when the countdown time is 10 seconds, "9" is displayed on the 1 second unit display unit 151 at the time of starting the countdown display and then, "8". "7", . . . , "1", and "0" are sequentially displayed every 1 second thereafter. Accordingly, the user can know numerals displayed on the 1 second unit display unit 151 are integer values of current countdown values. In an example of FIG. 11, "9" is displayed on the 1 second unit display unit 151.

The 0.1 second unit display unit 152 is constituted by ten rectangular frames generally shown as 152A on which values of 0 to 9 are displayed. The values of from 9 to 0 are sequentially selected every 0.1 second after the countdown display is started and a predetermined color is displayed on a frame corresponding to equal to or less than a selected value out of each of the frames 152A of the 0.1 second unit display unit 152. When the value of "0" is selected, the values are sequentially selected from the value of "9" again.

For example, the value of "9" is selected at the time of starting the countdown display and a predetermined color is displayed on the frame 152A on which numerals equal to or less than 9, that is, all the frames 152A of the 0.1 second unit display unit 152. After then, "8", "7", . . . , and "1" are sequentially selected every 0.1 and a predetermined color is displayed on the frame 152A on which values equal to or less than the selected value. Accordingly, the user can know the maximum numeral of the numerals displayed on the frame 152A out of the frames 152A on which the predetermined color is displayed is a decimal value of a current countdown value.

In the example of FIG. 11, a predetermined color is displayed on the frame 152A on which values equal to or less than 5 of the 0.1 second unit display unit 152. Accordingly, in the example of FIG. 11, the countdown value is 9.5 and the reproduction of the material data is started 9.5 seconds after then.

Figure 12:
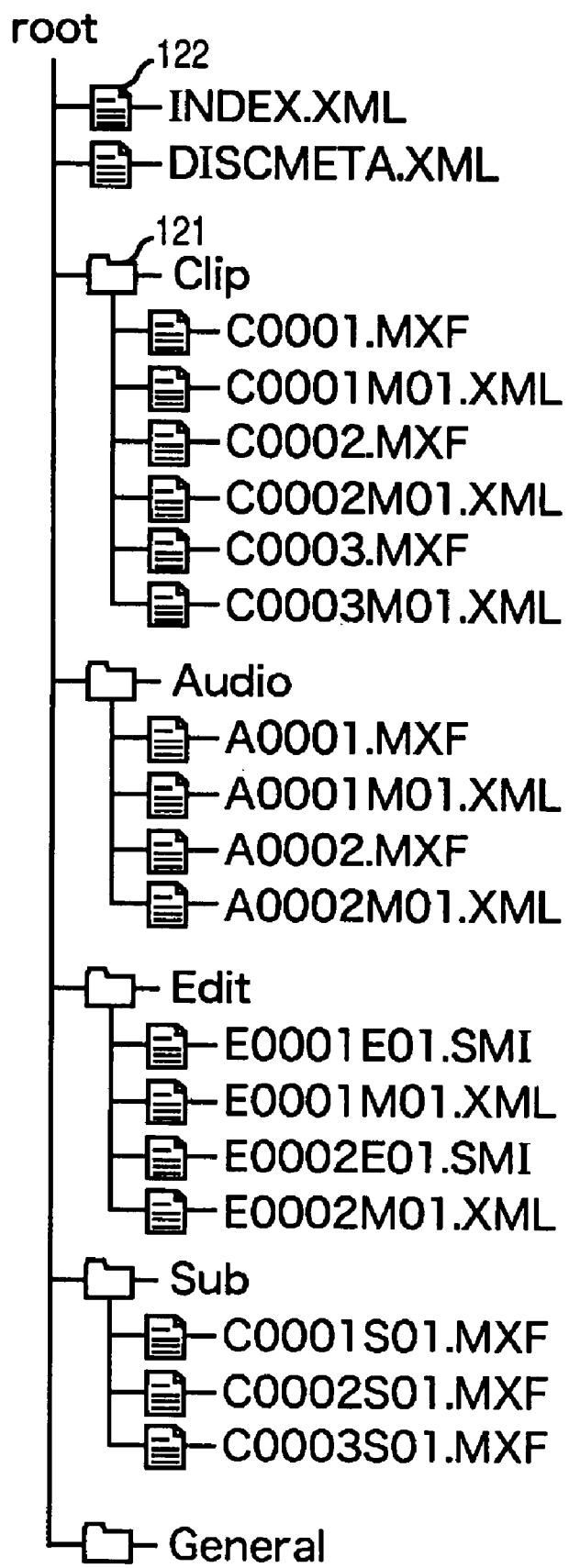
FIG. 12 is a diagram illustrating an example of a directory of a file recorded in an optical disc after adding VO according to an embodiment of the present invention.

FIG. 12 illustrates an example of a directory structure of a file recorded in the optical disc 21A after adding the VO.

The same constituent members as those of FIG. 4 are denoted by the same reference numerals and signs. A description thereof is repeated and thus, it is omitted.

In FIG. 12, an audio directory (Audio) in which a VO data file is provided in a lower directory thereof in addition to the index file (INDEX.XML) 122, the disc meta file (DISC-META.XML), the clip directory (Clip) 121, the edit directory (Edit), the proxy directory (Sub), and the general directory (General), which describes a path of a representative image and titles or comments of the optical disc 21A are provided in the optical disc 21A are provided in the optical disc 21A.

The VO data stored in the optical disc 21A is recorded in the audio directory (Audio) with different files every VO adding process of adding the VO.

For example, in the example of FIG. 12, a first VO data file (A0001.MXF) serving as a file including the VO data recorded by a first VO adding process and a metadata file for the first VO data (A0001M01.XML) serving as a file including metadata corresponding to the VO data are provided in a low directory of the audio directory (Audio).

Similar to the first VO data file (A0001.MXF) and the metadata file for the first VO data (A0001M01.XML), a second VO data file (A0002.MXF) corresponding to a second VO adding process and a metadata file for the second VO data (A0002M01.XML) are provided in a low directory of the audio directory.

Figure 13:
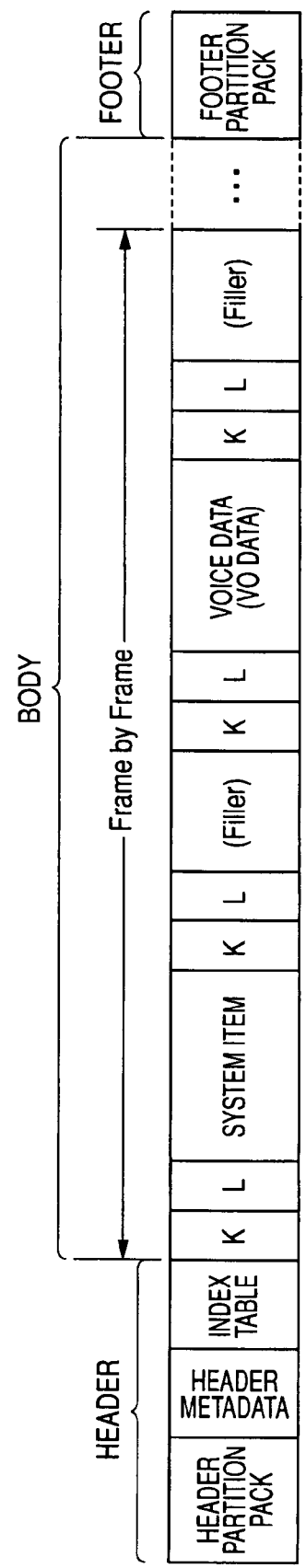
FIG. 13 is a diagram illustrating an example of a format of a VO data file according to an embodiment of the present invention.

FIG. 13 illustrates a format of the VO data file of FIG. 12.

For example, FIG. 13 illustrates a format when VO data having a linear PCM type is employed as the VO data which is the voice data disposed in the body.

As shown in FIG. 13, the system item in which the real-time metadata for one frame is disposed and the VO data coded in the linear PCM format are collectively disposed in the body for the amount acquired by one VO adding process, and the header and the footer are added to the body, thereby forming the VO data file.

The system item and the VO data are KLV-coded so as to have the KLV structure and they are disposed similarly to the system items of the clip file shown in FIG. 5. The KLV-coded system item and the VO data have the fixed length based on the KAG as the length of the data similarly to the system item shown in FIG. 5.

The header partition pack, the header metadata, and the index table are sequentially disposed in the header from the head similarly to the header shown in FIG. 5. The footer includes the footer partition pack similarly to the footer shown in FIG. 5.

FIG. 14 illustrates an example of the edit list of the edit list file updated after adding the VO.

FIG. 14 illustrates a detailed description example of the edit list file described in the XML.

The VO data (in the example of FIG. 14, the VO data is described as VoiceOver, for example, the VO data is called the VO data of the first VO data file (A0001.MXF) shown in FIG. 12 in addition to the first clip and the second clip are simultaneously reproduced in the edit list file shown in FIG. 14. Lines 1 to 8, 10 to 12, and 18 to 20 of the edit list shown in FIG. 14 are the same as lines 1 to 8, 10 to 12, and 14 to 16 of the edit list shown in FIG. 6. Accordingly, a description thereof is omitted.

In FIG. 14, a description of "trackSrc="CH1;CH2;CH3"" in line 9 represents that only voice data of three channels such as channel numbers of 1 to 3 are reproduced out of voice data of four channels included in the first clip. A description of "trackDst="CH1;CH2;CH3"" in line 9 followed by the description represents that the voice data of three channels such as channel numbers of 1 to 3 are output as voice data of the same channel thereas.

Accordingly, in the example of FIG. 14, the reproduction of the first clip is started from the position of frame number "00:00:00:00" at time "00:00:00:00" and the reproduction of the first clip is ended at the position of frame number "00:00:06:00" similarly to the example of FIG. 6, but voice data of a channel corresponding to a channel number of 4 is not reproduced out of the voice data of four channels. At this time, since the number of channels of the reproducible voice data is 4, a channel corresponding to a channel number of 4 is secured for the reproduction of the VO data.

In FIG. 14, a description of "trackSrc="CH1;CH2;CH3"" in line 13 represents that only voice data of three channels such as channel numbers of 1 to 3 are reproduced out of voice data of four channels included in the second clip similar to the first clip. A description of "trackDst="CH1;CH2;CH3"" in line 13 followed by the description represents that the voice data of three channels such as channel numbers 1 to 3 are output as voice data of the same channel thereas similarly to the first clip.

In the example of FIG. 14, the reproduction of the second clip is started from the position of frame number "00:00:00:00" at time "00:00:06:00" and the reproduction of the second clip is ended at the position of frame number "00:00:04:00" similarly to the example of FIG. 6, but voice data of a channel corresponding to channel number of 4 among the four channels included in the second clip is not reproduced out of the voice data of four channels. The user can change the reproduction channel and the output channel appropriately.

In FIG. 14, a reference file and a reproduction scope of the reference file are described in an audio element described in lines 15 to 17. A description of "src="urn:smpte:umid:060A2B340101010501010843130000000D9510E00333605-970 800460201180707"" in line 15 represents that an UMID allocated to a file of a reference destination is "060A2B340101010501010843130000000D9510E0033360-5970800460201180707".

A description of "clipBegin="smpte-30=00:00:00:00"" in line 16 represents a position starting reproduction of the VO data on a FTC (Film Time Code) of the VO data and the unit is set to the number of frames. A description of "clipEnd="smpte-30=00:00:00:00"" in line 16 followed by the description represents a position ending reproduction of the VO data on the FTC of the VO data. A description of "begin="smpte-30=00:00:00:00"" in line 16 followed by the description represents a time starting the VO data, that is, a position on the FTC of the edit list in which the VO data is started and the unit is set to the number of frames.

A description of "trackSrc="CH4"" in line 17 represents a channel corresponding to VO data serving as a reproduction target out of VO data of each of channels included in the first VO data. Here, each of the VO data files includes the VO data of four channels. In the example of FIG. 14, the only first VO data of a channel corresponding to a channel number of 4 is reproduced out of the VO data of four channels included in the first VO data file.

A description of "trackDst="CH4"" in line 17 followed by the description represents that VO data of each of channels serving as a reproduction target is output as voice data of a channel corresponding to any channel number.

As described above, in the example of FIG. 14, it is described in the edit list that reproduction of the VO data is started from a position of frame number "00:00:00:00" at time "00:00:00:00" and the reproduction of the first clip is ended at a position of frame number "00:00:10:00". At this time, the VO data of the channel corresponding to the channel number of 4 out of the VO data of the channels included in the first VO data file are reproduced as voice data of the same channels thereas.

In the edit list of FIG. 14, the above-mentioned reproduction of the VO data in addition to the reproduction of the first clip and the reproduction of the second clip shown in FIG. 6 are designated to be performed simultaneously by the par element. Accordingly, the first clip and the second clip are successively reproduced at time "00:00:00:00" to time "00:00:10:00" and at the same time, the VO data is reproduced.

Figure 15:
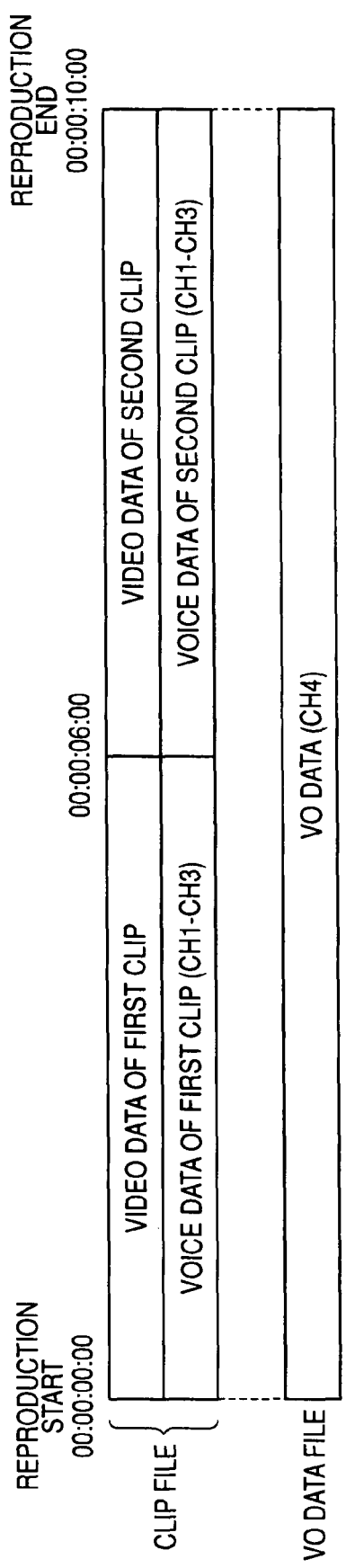
FIG. 15 is a diagram illustrating reproduction of an editing result after adding VO according to an embodiment of the present invention.

As shown in FIG. 15, the first clip is reproduced at from a position of frame number "00:00:00:00" at time "00:00:00:00" to a position of frame number "00:00:06:00" at time "00:00:00:00" to time "00:00:06:00", and at the same time, the VO data are reproduced at from the position of frame number "00:00:00:00" to the position of frame number "00:00:06:00".

At this time, the voice data of the channel corresponding to channel numbers of 1 to 3 included in the first clip file is output as the voice data of the channel corresponding to channel numbers of 1 to 3 and the VO data of the channel corresponding to the channel number of 4 included in the first VO data file is output as the voice data of the channel corresponding to the channel number of 4.

Next, at time "00:00:06:00", the second clip is reproduced at the position of frame number "00:00:00:00" to the position of frame number "00:00:04:00", and at the same time, the VO data is reproduced at the position of frame "00:00:06:00" to the position of frame number "00:00:10:00".

Even at this time, similarly to the first clip, the voice data of the channel corresponding to channel numbers of 1 to 3 included in the second clip file is output as the voice data of the channel corresponding to channel numbers of 1 to 3 and the VO data of the channel corresponding to the channel number of 4 included in the first VO data file is output as the voice data of the channel corresponding to the channel number of 4.

As described above, it is possible to reproduce the VO data through two clips such as the first clip and the second clip by performing the reproduction on the basis of the edit list of FIG. 15.

Figure 16:
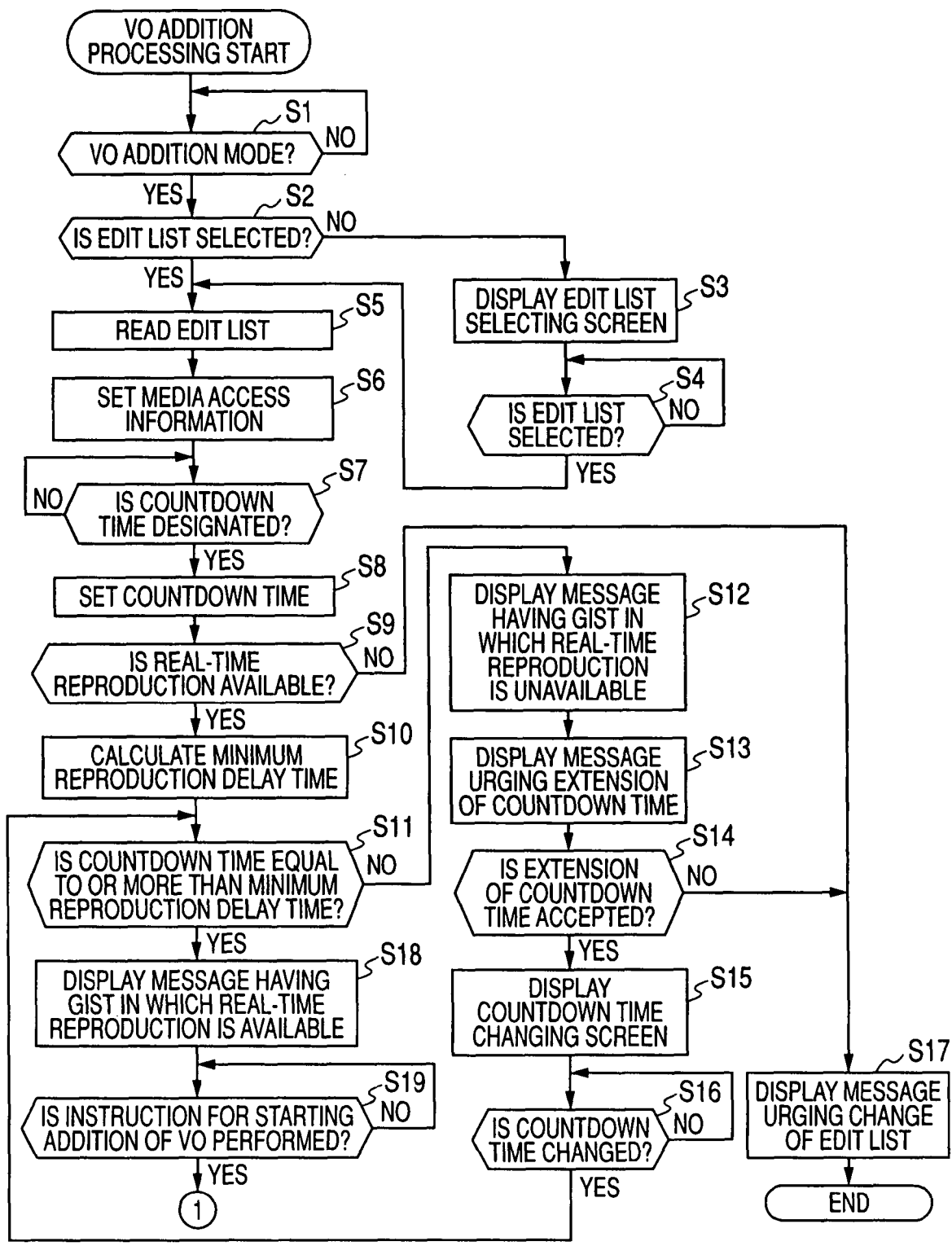
FIG. 16 is a flowchart illustrating a VO adding process according to an embodiment of the present invention.

Next, the VO adding process in which the VO processing unit 80 of FIG. 3 adds the VO will be described with reference to FIGS. 16 to 18. For example, the VO adding process is started when a power of the VO adding device 24 of FIG. 2 is turned on. The required reproduction rate, the reading rate, and the available storage capacity, and the seek time function out of the reproduction conditions are set in advance.

In Step S1, the reproduction unit 81 determines whether or not an operation mode of the VO adding device 24 is a VO adding mode adding the VO data in accordance with an operation signal supplied from the operation unit I/F 55.

Specifically, the user gives a command for setting the operation mode to the VO adding mode by operating the operation unit 42. The operation unit I/F 55 supplies the operation signal corresponding to the operation to the reproduction unit 81 and the reproduction unit 81 sets the operation mode to the VO adding mode in accordance with the operation signal. By this configuration, in Step S1, the operation unit 81 determines whether or not the operation mode is set to the VO adding mode.

In Step S1, when it is determined that the operation mode is not set to the VO adding mode, the operation unit 81 is on standby until the operation mode is set to the VO adding mode.

Alternatively, in Step S1, when it is determined that the operation mode is set to the VO adding mode, the process proceeds to Step S2. The reproduction unit 81 determines whether or not an edit list corresponding to an editing result of adding the VO is selected by the user.

Specifically, the user gives a command for selecting the edit list corresponding to the editing result of adding the VO by operating the operation unit 42. The operation unit I/F 55 supplies the operation signal corresponding to the operation to the reproduction unit 81 and the reproduction unit 81 specifies the edit list corresponding to the editing result of adding the VO in accordance with the operation signal. By this configuration, in Step S2, the reproduction unit 81 determines whether or not the edit list corresponding to the editing result of adding the VO is specified.

In Step S2, when it is determined that the edit list corresponding to the editing result of adding the VO is not selected, the process proceeds to Step S3. The notification unit 85 prepares video data for displaying an edit list selecting screen serving as a screen for selecting the edit list, supplies the prepared video data to the video display I/F 59 shown in FIG. 2, and displays the edit list selecting screen on the video monitor 44.

Here, the user selects the edit list corresponding to the editing result of adding the VO by operating the operation unit 42 while viewing the edit list selecting screen displayed on the video monitor 44.

After a process in Step S3, the process proceeds to Step S4. The reproduction unit 81 determines whether or not the edit list corresponding to the editing result of adding the VO is selected by the user in accordance with the operation signal from the operation unit I/F 55. When it is determined that the edit list is not selected, the reproduction unit 81 is on the standby until the edit list is selected.

When it is determined that the edit list is selected in Step S2, or when it is determined that the edit list is selected in Step S4, the process proceeds to Step S5 and the reproduction unit 81 controls the optical disc drive I/F 54, reads the selected edit list from the optical disc 21A, and supplies the read edit list to the setting unit 84 and the updating unit 86.

After a process in Step S5, the process proceeds to Step S6 and the setting unit 84 sets the media access information as one reproduction condition on the basis of the edit list read by the reproduction unit 81. The setting unit 84 supplies the currently set reproduction condition to the reproduction unit 81 and the calculation unit 82.

After a process in Step S6, the process proceeds to Step S7 and the setting unit 84 determines whether not the countdown time is designated by the user in accordance with the operation signal from the operation unit I/F 55, that is, whether or not the countdown time is designated by the user's operating of the operation unit 42. When it is determined that the countdown time is not designated, the setting unit 84 is on standby until the countdown time is designated.

Alternatively, when it is determined that the countdown time is designated in Step S7, the process proceeds to Step S8 and the setting unit 84 sets the countdown time designated by the user in accordance with the operation signal from the operation unit I/F 55 and supplies the countdown time to the reproduction unit 81 and the availability determining unit 83. Then, the process proceeds to Step S9.

In Step S9, the calculation unit 82 determines whether or not the real-time reproduction can be carried out, that is, whether or not the media reading line Lr which is above the real-time reproduction line Lp and below the memory upper-limit line Lup is prepared on the basis of the reproduction condition supplied from the setting unit 84.

When it is determined that the real-time reproduction cannot be carried out in Step S9, the notification unit 85 displays a message representing that the real-time reproduction cannot be carried out on the video monitor 44. Then, the process proceeds to Step S17.

On the other hand, when it is determined that the real-time reproduction can be carried out in Step S9, the process proceeds to Step S10 and the calculation unit 82 calculates a minimum time out of times from a start time to a reproduction start time of the reading line Lr which is determined to be prepared in Step S9 as the minimum reproduction delay time and supplies the minimum time to the availability determining unit 83. Then, the process proceeds to Step S11.

In step S11, the availability determining unit 83 determines whether or not the countdown time is equal to or longer than the minimum reproduction delay time, that is, whether or not real-time reproduction of the editing result corresponding to the edit list can be carried out on the basis of the countdown time from the setting unit 84 and the minimum reproduction delay time from the calculation unit 82, and supplies the determination result to the notification unit 85.

When it is determined that the countdown time is less than the minimum reproduction delay time in Step S11, that is, that the real-time reproduction of the editing result corresponding to the edit list, the process proceeds to Step S12 and the notification unit 85 displays a message representing that the real-time reproduction of the editing result corresponding to the edit list cannot be carried out, which represents the determination result in accordance with the determination result from the availability determining unit 83 on the video monitor 44.

After a process in Step S12, the process proceeds to Step S13 and the notification unit 85 displays a message urging extension of the countdown time on the video monitor 44 to require a change of the countdown time. Here, the user commands acceptance or rejection of the extension of the countdown time by viewing the message urging the extension of the countdown time, which is displayed on the video monitor 44 and operating the operation unit 42

After a process in Step S13, the process proceeds to Step S14 and the notification unit 85 determines whether on not the extension of the countdown time is accepted by the user in accordance with the operation signal from the operation unit I/F 55. When it is determined that the extension of the countdown time is not accepted, the process proceeds to Step S17.

Alternatively, when it is determined that the extension of the countdown time is accepted in Step S14, the process proceeds to Step S15 and the notification unit 85 displays a countdown time changing screen which is a screen for changing the countdown time on the video monitor 44. Here, the user inputs a changed countdown time by operating the operation unit 42 while viewing the countdown time changing screen displayed in the video monitor 44. At this time, the notification unit 85 may display a time (hereinafter, referred to as a recommendation time) to be recommended for the user as the countdown time on the video monitor 44.

In this case, the calculation unit 82 calculates a maximum reproduction delay time at which the memory upper-limit line Lup is above the media reading line Lr, that is, a maximum reproduction delay time which is a maximum reproduction delay time required for the real-time reproduction on the basis of the reproduction condition from the setting unit 84 and supplies the maximum reproduction delay time to the notification unit 85. The calculation unit 82 supplies the minimum reproduction delay time calculated in Step S10 to the notification unit 85. The notification unit 85 displays a time of from the minimum reproduction delay time to the maximum reproduction delay time as the recommendation time on the video monitor 44.

After a process in Step S15, the process proceeds to Step S16 and the setting unit 84 determines whether or not the countdown time is changed by the user, that is, whether or not the changed countdown time is input by the user in accordance with the operation signal from the operation unit I/F 55. When it is determined that the countdown time is not changed, the setting unit 84 is on standby until the countdown time is changed.

When it is determined that the countdown time is changed by the user in Step S16, the setting unit 84 sets the countdown time input by the user as a new countdown time. Then, the process returns to Step S11.

In step S17, the notification unit 85 displays a message urging a change of the edit list on the video monitor 44 to end the process.

Alternatively, when it is determined that the countdown time is equal to or longer than the minimum reproduction delay time in Step S11, the process proceeds to Step S18 and the notification unit 85 displays in the video monitor 44 the message representing that the real-time reproduction can be carried out, which represents the determination result in accordance with the determination result from the availability determining unit 83.

After a process in Step S18, the process proceeds to Step S19 and the countdown processing unit 87 determines whether or not a command for starting addition of the VO is given by the user in accordance with the operation signal from the operation unit I/F 55. When it is determined that the command for starting the addition of the VO is not given by the user, the countdown processing unit 87 is on standby until the command is given.

Figure 17:
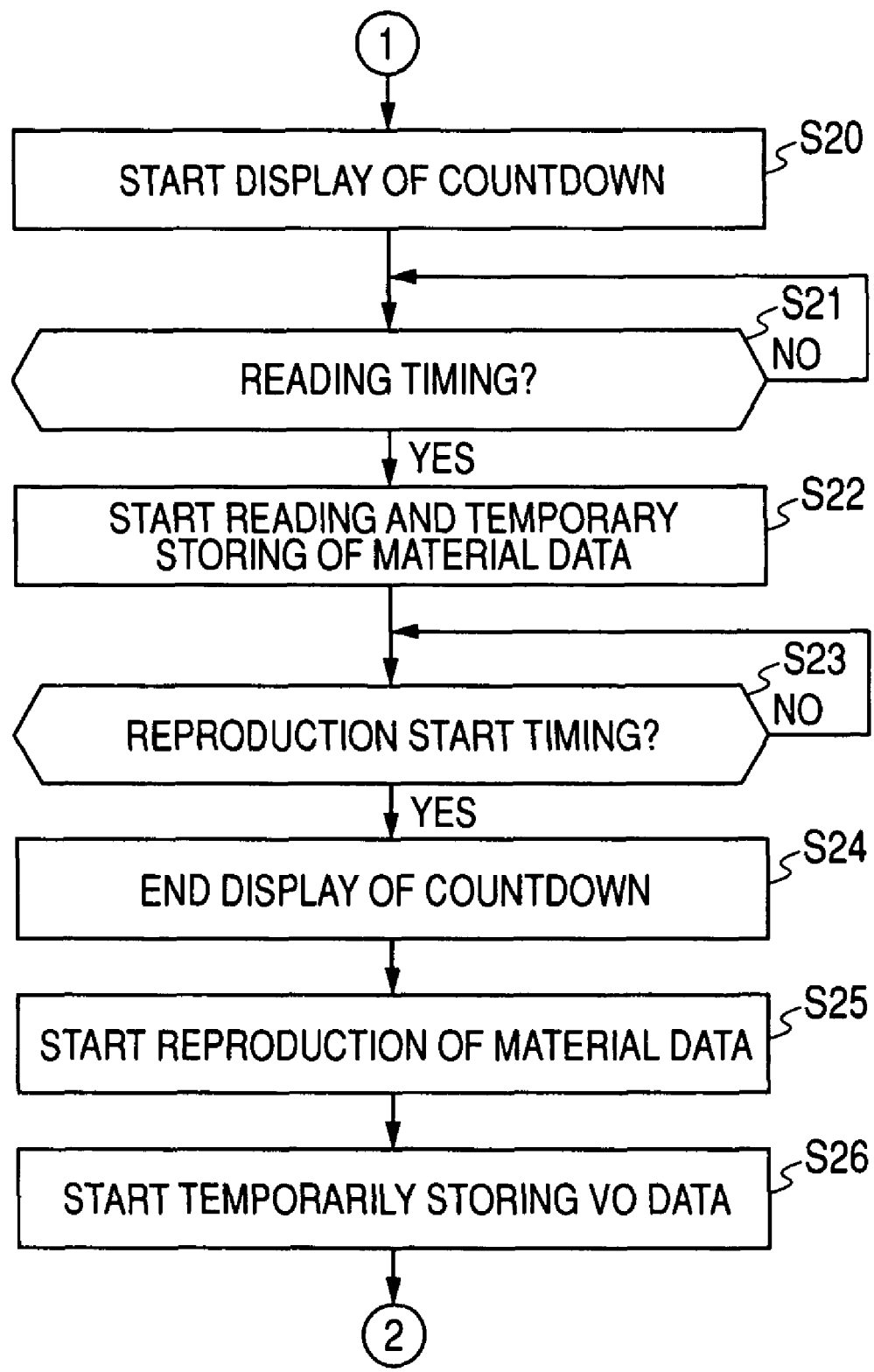
FIG. 17 is a flowchart illustrating a VO adding process according to an embodiment of the present invention.
Figure 18:
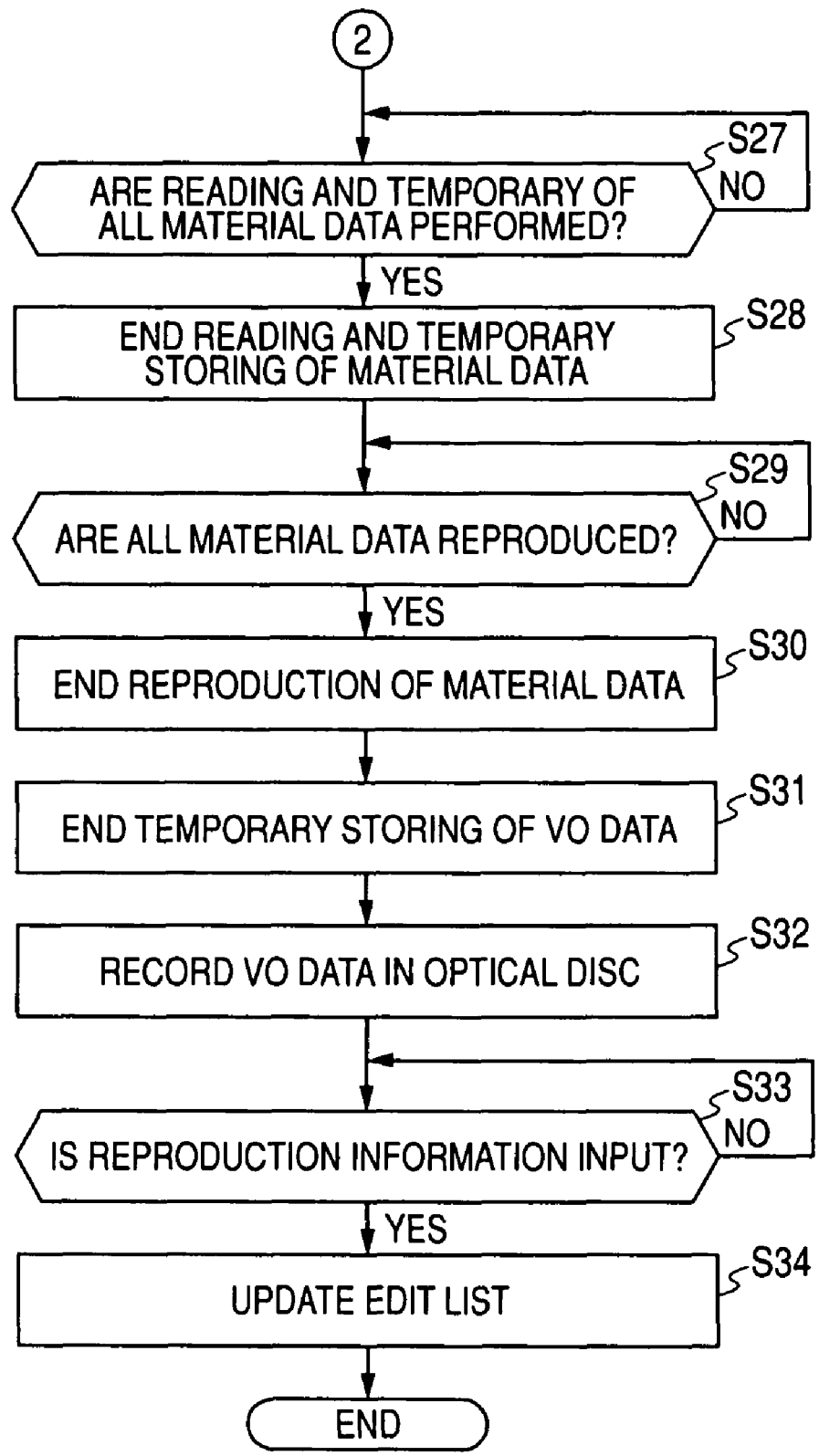
FIG. 18 is a flowchart illustrating a VO adding process according to another embodiment of the present invention.

Alternatively, when it is determined that the command for starting the addition of the VO is given by the user in Step S19, the process proceeds to Step S20 of FIG. 17 and the countdown processing unit 87 commands a start of clocking of a time to the timer unit 89 and starts the countdown display on the basis of the time information supplied from the timer unit 89 in accordance with the command.

Specifically, the countdown processing unit 87 controls the video display I/F 59 and displays a screen shown in FIG. 11 on the video monitor 44 on the basis of the time information supplied from the time unit 89 in accordance with the command of the start of clocking the time. Alternatively, the countdown processing unit 87 changes a display of the 1 second unit display unit 151 every 1 after the timer unit 89 starts to clock the time and changes display of the 0.1 second unit display unit 152 every 0.1 after the time unit 89 starts to clock the time.

After a process in Step S20, the process proceeds to Step S21 and the reproduction unit 81 determines whether or not a reading timing is up. Specifically, the reproduction unit 81 determines whether or not a timing at which a time corresponding to a difference between the countdown time and the minimum reproduction delay time elapses after the timer unit 89 starts to clock the time, that is, after the countdown display is started is up on the basis of the time information supplied from the timer unit 89 and the countdown time supplied from the setting unit 84.

In Step S21, when it is determined that the reading timing is not up, that is, that the time corresponding to the difference between the countdown time and the minimum reproduction delay time does not elapse, the reproduction unit 81 is on standby until it is determined that the reading timing is up.

Alternatively, when it is determined that the reading timing is up in Step S21, that is, that the timing at which the time corresponding to the difference between the countdown time and the minimum reproduction delay time elapses is up, the process proceeds to Step S22, and the reproduction unit 81 starts reading of the material data constituting the editing result corresponding to the edit list read in Step S5 from the optical disc 21A and temporary storage of the read material data into the temporary storage memory 65 on the basis of the media access information out of the reproduction conditions supplied from the setting unit 84.

After a process in Step S22, the process proceeds to Step S23 and the reproduction unit 81 determines whether or not a reproduction start timing which is a time to start to reproduce the material data is up, that is, whether or not the countdown time elapses after the timing unit 89 starts to clock the time.

When it is determined that the reproduction start timing is not up, the reproduction unit 81 is on standby until the reproduction start timing has elapsed, or expired.

When it is determined that the reproduction start timing is up (has elapsed or expired) in Step S23, the process proceeds to step S24, and the countdown processing unit 87 ends the countdown display started in Step S20. Accordingly, the countdown display is performed for the countdown time from a time before the countdown time earlier than the reproduction start timing.

After a process in Step S24, the process proceeds to Step S25 and the reproduction unit 81 controls the temporary storage memory I/F 53, the voice output I/F 57, and the video display I/F 59. The reproduction unit 81 stores the material data in the temporary storage memory 65. The reproduction unit 81 starts the reproduction of the material data constituting the editing result. At this time, the reproduction unit 81 commands the VO processing unit 88 to start the temporary storage of the VO data.

After a process in Step S25, the process proceeds to Step S26 and the VO addition processing unit 88 starts the temporary storage of the VO data corresponding to the voice input into the microphone 24A in the temporary storage memory 65 in accordance with the command from the reproduction unit 81. Then, the process proceeds to Step S27 of FIG. 18.

In Step S27, the reproduction unit 81 determines whether or not reading of all the material data constituting the editing result from the optical disc 21A and the temporary storage of the all the material data in the temporary storage memory 65 has been performed. The reading is based on the media access information supplied from the setting unit 84.

When it is determined that the reading and the temporary storage of the all the material data constituting the editing result are not performed in Step S27, the reproduction unit 81 is on standby until the reading and the temporary storage of the all the material data constituting the editing result are performed.

Alternatively, when it is determined that the reading and the temporary storage of all the material data constituting the editing result have been performed in Step S27, the process proceeds to Step S28 and the reproduction unit 81 ends the reading and the temporary storage of the material data started in Step S22 shown in FIG. 17. Then, the process proceeds to Step S29.

In Step S29, the reproduction unit 81 determines whether or not all the material data stored in the temporary storage memory 65 is reproduced. When it is determined that all the material data are not yet reproduced, the reproduction unit 81 is on standby until the all the material data are reproduced.

When it is determined that all the material data stored in the temporary storage memory 65 are reproduced in Step S29, the process proceeds to Step S30 and the reproduction unit 81 ends the reproduction of the material data started in Step S25 shown in FIG. 17.

After a process in Step S30, the process proceeds to Step S31 and the VO addition processing unit 88 ends temporary storage of the VO data started in Step S26. Then, the process proceeds to Step S32.

In Step S32, the VO addition processing unit 88 reads the VO data temporarily stored in the temporary storage memory 65 and records the read VO data in the optical disc 21A as a VO data file having a format shown in FIG. 13. Accordingly, the directory structure of the file recorded in the optical disc 21A is changed from the directory structure shown in FIG. 4 to the directory structure shown in FIG. 12, for example. The VO addition processing unit 88 supplies the UMID information applied to the VO data to the updating unit 86.

After a process in Step S32, the process proceeds to Step S33 and the updating unit 86 determines whether or not reproduction information on reproduction of the VO data is input by the user, that is, whether or not the operation signal corresponding to the reproduction information input by the user is supplied from the operation unit I/F 55 in accordance with the operation signal supplied from the operation unit I/F 55.

The reproduction information represents information on a reproduction channel and an output channel of the VO data included in the voice data and the VO data included in the clip, a reproduction sector (an editing sector) of the VO data recorded in the optical disc 21A, and a time at which the VO data is started.

In Step S33, when it is determined that the reproduction information is not input, the updating unit 86 is on standby until the reproduction information is input.

Alternatively, when it is determined that the reproduction information is input in Step S33, the process proceeds to Step S34 and the updating unit 86 controls the optical disc drive I/F 54 and updates the edit list recorded in the optical disc 21A on the basis of the operation signal corresponding to the input reproduction information, the edit list supplied from the reproduction unit 81, and the UMID information of the VO data supplied from the VO addition processing unit 88.

For example, when the edit list supplied from the reproduction unit 81 is the same as the edit list shown in FIG. 6, the updating unit 86 changes lines 9 and 13 of the edit list shown in FIG. 6 so as to secure the channel corresponding to the channel number of 4 out of the channels corresponding to the voice data included in the clip for the reproduction of the VO data in accordance with the operation signal corresponding to the reproduction channel and the output channel of the voice data included in the reproduction information at first.

The updating unit 86 changes the par element shown in FIG. 6 so that the VO data is reproduced simultaneously with the first clip and the second clip based on the editing sector, the operation signal corresponding to the time at which the VO data is started, and the UMID information which are included in the reproduction information.

For example, the updating unit 86 describes a position at which the VO data is reproduced and a position at which the reproduction of the VO data is ended on the basis of the editing sector included in the reproduction information. The updating unit 86 describes the time at which the VO data is started on the basis of the time at which the VO data is started, which is included in the reproduction information. The updating unit 86 describes the reproduction channel and the output of the channel of the VO data on the basis of the output channel and the output channel of the VO data included in the reproduction information. As the result, the edit list shown in FIG. 6 is updated by the edit list shown in FIG. 14. Thus, the VO adding process is performed.

The reproduction unit 81 of the VO element device 24 buffers the material data and the VO data to the temporary storage memory 65, and reproduces the material data and the VO data simultaneously to reproduce the white package in accordance with the edit list recorded in the optical disc 21A by the user's command after the VO adding process as shown in FIG. 15.

As described herein, when a command for starting the addition of the VO is given by the user, the VO adding device 24 starts the countdown display and starts the temporary storage of the VO data by ending the countdown display at the reproduction start timing. Accordingly, the user is notified of a standby time representing a time for which the temporary storage of the VO data is actually started after giving the command for starting the addition of the VO and a start timing of the temporary storage of the VO data.

Accordingly, the user does not feel anxious or uneasy about whether the VO adding device 24 performs a process corresponding to the command until the temporary storage of the VO data is actually started. More specifically, the reproduction of the material data constituting the editing result is started after giving the command for starting the addition of the VO. Even when the temporary storage of the VO data is started at the timing at which the material data is reproduced, the user can input voice of the VO without a delay. Thus, a user has more control and flexibility when adding VO, such as a narrative, since the user does not need to be concerned that the VO (narrative) will be incongruous, or "out-of-sync" with the material data.

In the VO adding device 24, the availability determining unit 83 determines whether or not the countdown time is equal to or exceeds the minimum reproduction delay time. When it is determined that the countdown time is less than the minimum reproduction delay time, the notification unit 85 requires the change of the countdown time. When it is determined that the countdown time is equal to or more than the minimum reproduction delay time, the countdown processing unit 87 performs the countdown display at the countdown time earlier than the time at which the material data is reproduced. Accordingly, it is possible to perform the real-time reproduction of the material data after the countdown is ended.

Although the countdown time is changed by the user in the above description, the VO adding device 24 may change the countdown time into the minimum reproduction delay time. For example, the setting unit 84 of the VO processing unit 80 may change the countdown time out of times from the minimum reproduction delay time to the maximum reproduction delay time into times having an interval of 5 seconds (for example, 5 seconds, 10 seconds, and 15 seconds).

The VO adding device 24 adds the VO data to the material data in the above description, but the VO adding device 24 may add VO data to the video data by recording the only video data in recording.

The material data is recorded in the optical disc in the present embodiment, but the material data may be recorded, for example, in the magnetic disc, the magneto-optical disc, the memory card, and a removable hard disc drive.

The present invention can be applied to a device which adds the video data to the voice data recorded therein. In this case, video data supplied from other devices or other recoding media is added to the voice data during reproducing the voice data recorded in the optical disc.

While embodiments of the present invention describe a program stored in a program recording medium, this description also includes processes performed in a temporal sequence in accordance with an order described therein and processes performed not in the temporal sequence, but in parallel or separately.

In the present specification, a system represents an entire apparatus constituted by a plurality of devices.

The embodiment of the invention is not limited to the above-mentioned embodiments, but various modifications may occur within the scope of the appended claims or the equivalents thereof.

It should be understood by those skilled in the art that various modifications, combinations, sub-combinations and alternations may occur depending on design requirements and other factors insofar as they are within the scope of the appended claims or the equivalents thereof.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A reproduction apparatus, having hardware elements, comprising:
   a calculation unit configured to calculate a minimum reproduction delay period and maximum reproduction delay time,
   wherein the minimum reproduction delay period being a minimum value of a reproduction delay time from a starting position to read the data from a recording medium to a starting position to reproduce the data, which is required to reproduce the data in real time;
   a setting unit configured to set a countdown time that is a predetermined unit time equal to or greater than the minimum reproduction delay period and less than the maximum reproduction delay time, which is calculated on a basis of a reproduction condition from the setting unit,
   wherein the reproduction condition comprises a required reproduction rate, a reading rate at the time of reading data from the storage medium, an available storage capacity, a seek time function, and media access information; and
   a countdown unit configured to perform a countdown from a time before the set countdown time prior to a time at which reproduction of the data is started.

2. A reproduction apparatus, having hardware element, comprising:
   means for reading data from a storage medium and outputting the data means for calculating a minimum reproduction delay time and a maximum reproduction delay time, the minimum reproduction delay time being a minimum value of a reproduction delay time from a starting position to read the data from a recording medium to a starting position to reproduce the data, which is required to reproduce the data in real time;
   means for setting a countdown time that is a predetermined unit time equal to or greater than the minimum reproduction delay time and less than the maximum reproduction delay time, which is calculated on a basis of a reproduction condition,
   wherein the reproduction condition comprises a required reproduction rate, a reading rate at the time of reading data from the storage medium, an available storage capacity, a seek time function, and media access information; and
   means for performing a countdown from a time before the set countdown time prior to a time at which reproduction of the data is started.

3. A reproduction apparatus having hardware elements, comprising:
   a reproduction unit for reading data from a storage medium and outputting the data;
   a setting unit configured to set a countdown time serving as a time for countdown;
   a calculating unit configured to calculate a minimum reproduction delay time and to calculate a maximum reproduction delay time;
   a determination unit configured to determine whether the countdown time is equal to or exceeds the minimum reproduction delay time, the minimum reproduction delay time being a minimum value of a reproduction delay period from a starting position to read the data from a recording medium to a starting position to reproduce the data, which is required to reproduce the data in real time;
   a changing unit configured to change the countdown time when it is determined that the countdown time is less than the minimum reproduction delay time by the determination unit,
   wherein, when it is determined that the countdown time is less than the minimum reproduction delay time by the determination unit, the calculation unit calculates the maximum reproduction delay time on a basis of a reproduction condition from the setting unit,
   wherein the reproduction condition comprises a required reproduction rate, a reading rate at the time of reading data from the storage medium, an available storage capacity, a seek time function, and media access information,
   wherein the changing unit changes the countdown time to a time greater than the minimum reproduction delay time and less than the maximum reproduction delay time; and
   a countdown unit configured to countdown from a time before the countdown time earlier than a time at which reproduction of the data is started when it is determined the countdown time is equal to or greater than the minimum reproduction delay time by the determination unit.

4. The reproduction apparatus according to claim 3, wherein the setting unit changes the countdown time based on the minimum reproduction delay period when the change of the countdown time is required by the changing unit.

5. The reproduction apparatus according to claim 3, further comprising:
   an acquisition unit configured to acquire voice data added to the data during the reproduction of the data; and a recording control unit configured to record the voice data acquired by the acquisition unit in the recording medium.

6. The reproduction apparatus according to claim 5, further comprising:
   a reproduction unit configured to reproduce the data and the voice data simultaneously by reading the data recorded in the recording medium and the voice data and buffering the data and the voice data to a predetermined buffer.

7. A reproduction method comprising:
   reading data from a storage medium and outputting the data;
   setting a countdown time for countdown;
   calculating a minimum reproduction delay time;
   calculating a maximum reproduction delay time;
   determining whether the countdown time is equal to or greater than the minimum reproduction delay time, the reproduction delay time being a minimum value of a reproduction delay period from a starting position to read the data from the recording medium to a starting position to reproduce the data, which is required to reproduce the data in real time;

changing the countdown time when it is determined that the countdown time is less than the minimum reproduction delay period;

the maximum reproduction delay time is calculated when it is determined that the countdown time is less than the minimum reproduction delay time on a basis of a reproduction condition from the setting step, wherein the reproduction condition comprises a required reproduction rate, a reading rate at the time of reading data from the storage medium, an available storage capacity, a seek time function, and media access information, wherein the changing step changes the countdown time to a time greater than the minimum reproduction delay time and less than the maximum reproduction delay time; and performing a countdown from a time before the countdown time earlier than a time at which reproduction of the data is started when it is determined the countdown time is equal to or greater than the minimum reproduction delay period.

8. A non-transitory computer readable medium for storing a program, the program comprising the steps of:

reading data from a storage medium and outputting the data;

setting a countdown time for countdown;

calculating a minimum reproduction delay time;

calculating a maximum reproduction delay time;

determining whether the countdown time is equal to or greater than a minimum reproduction delay time, the reproduction delay time being a minimum value of a reproduction delay period from a starting position to read the data from the recording medium to a starting position to reproduce the data, which is required to reproduce the data in real time;

changing the countdown time when it is determined that the countdown time is less than the minimum reproduction delay period;

the maximum reproduction delay time is calculated when it is determined that the countdown time is less than the minimum reproduction delay time on a basis of a reproduction condition, wherein the reproduction condition comprises a required reproduction rate, a reading rate at the time of reading data from the storage medium, an available storage capacity, a seek time function, and media access information, wherein the changing step changes the countdown time to a time greater than the minimum reproduction delay time and less than the maximum reproduction delay time; and performing a countdown from a time before the countdown time earlier than a time at which reproduction of the data is started when it is determined the countdown time is equal to or greater than the minimum reproduction delay period.

9. A reproduction apparatus, having hardware elements, comprising:

means for reading data from a storage medium and outputting the data means for setting a countdown time;

means for calculating a minimum reproduction delay time and calculating a maximum reproduction delay time;

means for a determining whether the countdown time is equal to or exceeds the minimum reproduction delay time, the minimum reproduction delay time being a minimum value of a reproduction delay period from a starting position to read the data from a recording medium to a starting position to reproduce the data, which is required to reproduce the data in real time;

means for changing the countdown time when it is determined that the countdown time is less than the minimum reproduction delay period;

wherein, when it is determined that the countdown time is less than the minimum reproduction delay time by the determination means, the calculation means calculates the maximum reproduction delay time on a basis of a reproduction condition from the setting means, wherein the reproduction condition comprises a required reproduction rate, a reading rate at the time of reading data from the storage medium, an available storage capacity, a seek time function, and media access information, wherein the changing means changes the countdown time to a time greater than the minimum reproduction delay time and less than the maximum reproduction delay time; and means for counting down from a time before the countdown time earlier than a time at which reproduction of the data is started when it is determined the countdown time is equal to or greater than the minimum reproduction delay period.

10. The reproduction apparatus according to claim 9, wherein the means for setting changes the countdown time based on the minimum reproduction delay period when a change of the countdown time is required.

11. The reproduction apparatus according to claim 9, further comprising:

means for acquiring voice data added to the data during the reproduction of the data; and means for recording the voice data acquired on the recording medium.

12. The reproduction apparatus according to claim 11, further comprising:

means for reproducing the data and the voice data simultaneously by reading the data recorded and the voice data and buffering the data and the voice data to a predetermined buffer.

* * * * *